(12) United States Patent
Kobayashi et al.

(10) Patent No.: US 11,846,366 B2
(45) Date of Patent: Dec. 19, 2023

(54) SOLENOID, ELECTROMAGNETIC VALVE, AND BUFFER

(71) Applicant: KYB CORPORATION, Tokyo (JP)

(72) Inventors: Yoshifumi Kobayashi, Tokyo (JP); Tomoyasu Abe, Tokyo (JP); Yuusuke Furuta, Tokyo (JP); Naoaki Danshita, Kyoto (JP); Kohei Doi, Kyoto (JP); Masatoshi Iyatani, Kyoto (JP)

(73) Assignee: KYB CORPORATION, Tokyo (JP)

( * ) Notice: Subject to any disclaimer, the term of this patent is extended or adjusted under 35 U.S.C. 154(b) by 68 days.

(21) Appl. No.: 17/626,720

(22) PCT Filed: Sep. 2, 2020

(86) PCT No.: PCT/JP2020/033319
§ 371 (c)(1),
(2) Date: Jan. 12, 2022

(87) PCT Pub. No.: WO2021/049395
PCT Pub. Date: Mar. 18, 2021

(65) Prior Publication Data
US 2022/0243839 A1 Aug. 4, 2022

(30) Foreign Application Priority Data
Sep. 9, 2019 (JP) .................................. 2019-163879

(51) Int. Cl.
*F16K 31/06* (2006.01)
*F16F 9/19* (2006.01)
*F16F 9/46* (2006.01)

(52) U.S. Cl.
CPC ............ *F16K 31/0675* (2013.01); *F16F 9/19* (2013.01); *F16F 9/461* (2013.01); *F16K 31/0651* (2013.01)

(58) Field of Classification Search
None
See application file for complete search history.

(56) References Cited

U.S. PATENT DOCUMENTS 3,100,103 A * 8/1963 Bullard ................. F16K 31/408
251/38
3,405,906 A * 10/1968 Keller ................... F16K 31/408
251/38

(Continued)

FOREIGN PATENT DOCUMENTS

JP S52-070328 U 5/1977
JP H07-041095 U 7/1995

(Continued)

OTHER PUBLICATIONS

Feb. 14, 2023, Japanese Office Action issued for related JP Application No. 2019-163879.

(Continued)

*Primary Examiner* — Matthew W Jellett
(74) *Attorney, Agent, or Firm* — Paratus Law Group, PLLC

(57) ABSTRACT

A solenoid includes a first fixed iron core and a second fixed iron core located on a first end side and a second end side of an axial direction of a coil, a first movable iron core and a second movable iron core located therebetween and attracted by the first fixed iron core and the second fixed iron core by passage of current through the coil, respectively, a spring that biases the first movable iron core to the second fixed iron core side, and a leaf spring that regulates movement of the first movable iron core to the second fixed iron core side with respect to the second movable iron core. The movement of the first movable iron core in a direction orthogonal to the axial direction of the coil with respect to the first fixed iron core and the second fixed iron core is regulated.

9 Claims, 7 Drawing Sheets

(56) References Cited

U.S. PATENT DOCUMENTS

| | | | | |
|---|---|---|---|---|
| 3,463,443 | A * | 8/1969 | Churchill | F16K 31/06 251/70 |
| 4,403,765 | A * | 9/1983 | Fisher | H01F 7/1646 335/266 |
| 4,494,726 | A * | 1/1985 | Kumar | F16K 31/408 251/44 |
| 4,760,694 | A * | 8/1988 | Gillon, Jr. | B64G 1/26 60/200.1 |
| 4,854,429 | A * | 8/1989 | Casey | F16F 9/465 188/266.2 |
| 6,443,420 | B1 * | 9/2002 | Hettinger | F16K 39/024 251/38 |
| 6,994,308 | B1 * | 2/2006 | Wang | F16K 1/12 251/129.21 |
| 7,334,770 | B2 * | 2/2008 | Wang | F02M 59/366 251/30.01 |
| 7,543,603 | B2 * | 6/2009 | Wang | F15B 13/0405 137/625.5 |
| 7,921,880 | B2 * | 4/2011 | Jackson | F15B 11/042 137/881 |
| 8,066,255 | B2 * | 11/2011 | Wang | F02M 21/0266 251/30.03 |
| 9,080,684 | B2 * | 7/2015 | Stahr | H01F 7/081 |
| 9,970,566 | B2 * | 5/2018 | Rovera | F16K 31/086 |
| 10,202,035 | B2 * | 2/2019 | Ogiwara | B60K 15/03519 |
| 2010/0213758 | A1 | 8/2010 | Nanahara | |
| 2013/0020514 | A1 | 1/2013 | Watanabe et al. | |
| 2016/0025237 | A1 | 1/2016 | Mori et al. | |
| 2018/0094741 | A1 | 4/2018 | Paulus | |
| 2021/0012939 | A1 | 1/2021 | Kamakura et al. | |

FOREIGN PATENT DOCUMENTS

| | | |
|---|---|---|
| JP | 2009-275735 A | 11/2009 |
| JP | 2011-256951 A | 12/2011 |
| JP | 2014-173716 A | 9/2014 |
| JP | 2019-160994 A | 9/2019 |

OTHER PUBLICATIONS

May 16, 2023, Japanese Office Action issued for related JP Application No. 2019-163879.

* cited by examiner (a)

(b)

SOLENOID, ELECTROMAGNETIC VALVE, AND BUFFER

CROSS REFERENCE TO PRIOR APPLICATION

This application is a National Stage Patent Application of PCT International Patent Application No. PCT/JP2020/033319 (filed on Sep. 2, 2020) under 35 U.S.C. § 371, which claims priority to Japanese Patent Application No. 2019-163879 (filed on Sep. 9, 2019), which are all hereby incorporated by reference in their entirety.

TECHNICAL FIELD

The present invention relates to a solenoid, a solenoid valve provided with the solenoid, and a shock absorber provided with the solenoid valve including the solenoid.

BACKGROUND ART

Conventionally, some solenoids each include a coil and a movable iron core that is attracted to one side of an axial direction of the coil by a flow of magnetic flux when a magnetic field is generated by passage of current through the coil. These solenoids can apply the force that attracts the movable iron core to other members (objects) as thrust force and change the thrust force according to the amount of current. Such solenoids are used, for example, for solenoid valves.

Some of the solenoid valves are each provided partway in a pressure control passage, and include a valve body that opens and closes the pressure control passage and a spring that biases the valve body in the opening direction, in addition to the solenoid, and give thrust force in the closing direction to the valve body by the solenoid. With such a solenoid valve, the valve opening pressure of the solenoid valve increases as the current amount supplied to the solenoid increases, and upstream pressure of the solenoid valve can be increased. Such a solenoid valves is used, for example, for shock absorbers.

In addition to the solenoid valve, some shock absorbers each include a main passage through which liquid flows when the shock absorber expands and contracts, and a main valve body that opens and closes the main passage. The pressure control passage provided with the solenoid valve is connected to a back pressure chamber formed on the back of the main valve body. With this shock absorber, as the current amount supplied to the solenoid increases to enhance the valve opening pressure of the solenoid valve, the back pressure of the main valve body (pressure in the back pressure chamber) increases, and the generated damping force can be increased (for example, Patent Literature 1).

CITATION LIST

Patent Literature

Patent Literature 1: Japanese Patent Application. Laid-Open No. 2014-173716

SUMMARY OF INVENTION

Technical Problem

Here, when the shock absorber is used for a vehicle suspension or the like, in order to improve the riding comfort during normal traveling when the vehicle travels on a good road, the damping force generated during normal traveling is preferably small. The shock absorber provided with the solenoid valve including the conventional solenoid can decrease the damping force generated when the current amount supplied to the solenoid is decreased, and can decrease power consumption during normal traveling and save power. However, in the conventional shock absorber, if the solenoid valve is fully opened and the back pressure of the main valve body is minimized at the time of failure when passage of current through the solenoid is cut off, the damping force at the time of failure will be insufficient.

Therefore, the valve body of the solenoid valve provided in the shock absorber described in Japanese Patent Application Laid-Open No. 2014-173716 includes two opening and closing portions that open and close the pressure control passage. Then, one of the opening and closing portions is biased in the opening direction by a spring, and functions as an opening and closing part during pressure control in which thrust force in the closing direction is applied by the solenoid. Meanwhile, the other opening and closing part closes the downstream side of the part opened and closed by one opening and closing part in the pressure control passage with one of the opening and closing parts fully opened by the biasing force of the spring when no current is passed through the solenoid.

Furthermore, the shock absorber includes a fail passage that is connected between a part of the pressure control passage that is opened and closed by one opening and closing part and a part that is opened and closed by the other opening and closing part, and is provided with a passive valve partway. Accordingly, when the pressure control passage is blocked by the other opening and closing part of the solenoid valve when no current is passed through the solenoid, liquid in the back pressure chamber begins passing through the fail passage, and the back pressure of the main valve body is set to the valve opening pressure of the passive valve. Therefore, even with the conventional shock absorber, the damping force of the shock absorber is not insufficient at the time of failure.

However, like the shock absorber described above, if two passages including the pressure control passage and the fail passage are provided as passages connected to the back pressure chamber to set the back pressure of the main valve body, and if the passage connected to the back pressure chamber is switched between when a current is passed and when no current is passed through the solenoid, the structure of the shock absorber becomes complicated and the cost increases. Meanwhile, if the valve body of the solenoid valve is biased in the direction of closing the valve body by a spring and thrust force in the direction of opening the valve body by the solenoid is applied, although it is unnecessary to switch the passage connected to the back pressure chamber between when a current is passed and when no current is passed through the solenoid, the current amount supplied to the solenoid needs to be increased when decreasing the damping force generated, which increases the power consumption during normal traveling.

That is, when the solenoid is used for a solenoid valve that makes the damping force of the shock absorber variable, or the like, the thrust force applied to the object such as the valve body is decreased when the current amount supplied to the solenoid is small, and even when no current is passed through the solenoid, it may be desirable to bias the object in the same direction as the thrust force, but this is not possible with the conventional solenoid. Therefore, when the conventional solenoid is used for the solenoid valve that makes the damping force of the shock absorber variable, there is a problem that the structure of the shock absorber becomes complicated and the power consumption during normal traveling of the vehicle increases.

Therefore, the present invention has been made in order to solve such a problem, and an object of the invention is to provide a solenoid, a solenoid valve, and a shock absorber in which when the current amount supplied to the solenoid is small, the thrust force of the solenoid applied to the object can be made small, and even when no current is passed through the solenoid, the object can be biased in the same direction as the thrust force when a current is passed.

Solution to Problem

A solenoid for solving the above-described problem includes a first fixed iron core and a second fixed iron core located on a first end side and a second end side of an axial direction of a coil, a first movable iron core and a second movable iron core located therebetween and attracted by the first fixed iron core and the second fixed iron core by passage of current through the coil, respectively, a spring that biases the first movable iron core to the second fixed iron core side, and a regulating part that regulates movement of the first movable iron core to the second fixed iron core side with respect to the second movable iron core. The movement of the first movable iron core in the direction orthogonal to the axial direction of the coil with respect to the first fixed iron core and the second fixed iron core is regulated.

With the above-described configuration, when the first movable iron core goes to the second fixed iron core side in response to biasing force of the spring and the regulating part regulates movement of the first movable iron core to the second fixed iron core side with respect to the second movable iron core when no current is passed through the solenoid, the biasing force of the spring is transmitted from the first movable iron core to the second movable iron core via the regulating part. Meanwhile, when the first movable iron core is attracted by the first fixed iron core and moves in the attraction direction when a current is passed through the solenoid, the spring is compressed by the first movable iron core, and the biasing force of the spring is not transmitted to the second movable iron core. In addition, when a current is passed through the solenoid, the second movable iron core is attracted by the second fixed iron core, and as the current amount supplied to the solenoid increases, the force that attracts the second movable iron core to the second fixed iron core increases.

Therefore, when the force that attracts the second movable iron core is applied to the object as thrust force when a current is passed through the solenoid, as the current amount supplied to the solenoid increases, the thrust force applied to the object increases, and as the current amount supplied to the solenoid decreases, the thrust force applied to the object can be decreased. Furthermore, when no current is passed, the biasing force of the spring acts on the object via the first movable iron core, the regulating part, and the second movable iron core. Since the direction of the biasing force of the spring is the same as the direction of the force that attracts the second movable iron core when a current is passed through the solenoid, with the above-described configuration, even when no current is passed through the solenoid, the object can be biased in the same direction as when a current is passed.

In addition, with the above-described configuration, the movement of the first movable iron core in the direction orthogonal to the axial direction of the coil with respect to the first fixed iron core and the second fixed iron core, that is, the movement in the radial direction is regulated. Therefore, the first movable iron core shifted in the radial direction does not hinder the movement of the second movable iron core, and the smooth up-and-down movement of the second movable iron core can be ensured.

In addition, the solenoid may further include an annular filler ring interposed between the first fixed iron core and the second fixed iron core, the second movable iron core may be tubular with a bottom and include an outer bottom portion and an outer tubular portion, and may be movably inserted into the filler ring in the axial direction with the outer bottom portion directed to the second fixed iron core side, the first movable iron core may be tubular with a bottom and include an inner bottom portion and an inner tubular portion with an outer diameter smaller than an inner diameter of the outer tubular portion, the inner tubular portion may be movably inserted into the outer tubular portion in the axial direction with the inner bottom portion directed to the second fixed iron core side, and the spring may be interposed between the inner bottom portion and the first fixed iron core with a first end side inserted into the inner tubular portion.

With the above-described configuration, when the coil is excited, a magnetic path is formed so as to pass through the first fixed iron core, the first movable iron core, the second movable iron core, and the second fixed iron core to attract the first movable iron core to the first fixed iron core and attract the second movable iron core to the second fixed iron core. Furthermore, the solenoid can be made small while space for housing the spring is secured inside the first movable iron core.

In addition, with the above-described configuration, when the first movable iron core moves to the second fixed iron core side, the inner bottom portion of the first movable iron core approaches the outer bottom portion of the second movable iron core. Therefore, when the regulating part is disposed such that the movement in the approaching direction can be regulated, the regulating part can regulate the movement of the first movable iron core to the second fixed iron core side with respect to the second movable iron core, and the regulating part can be easily disposed.

Furthermore, with the above-described configuration, the outer tubular portion of the second movable iron core is located between the inner tubular portion of the first movable iron core and the filler ring. As described above, the radial movement of the first movable iron core with respect to the first fixed iron core and the second fixed iron core is regulated, and the filler ring is fixedly provided to the first fixed iron core and the second fixed iron core. Therefore, when the first movable iron core moves, the first movable iron core does not shift in the radial direction with respect to the filler ring, it is possible to prevent the outer tubular portion of the second movable iron core from being sandwiched between the first movable iron core shifted in the radial direction and the filler ring, and to prevent the sliding resistance during the movement from increasing.

In addition, the first movable iron core of the solenoid may include a guide portion located at an outer circumference of a tip of the inner tubular portion protruding outward from the outer tubular portion and in sliding contact with an inner circumference of the filler ring. With such a configuration, it is easy to regulate the movement of the first movable iron core in a direction orthogonal to the axial direction of the coil with respect to the first fixed iron core and the second fixed iron core. In addition, by lengthening the guide portion in the axial direction, the inclination of the first movable iron core within the filler ring can be inhibited.

In addition, the first movable iron core of the solenoid may include a guide portion extending from the tip of the inner tubular portion in the axial direction, and the guide portion may be slidably inserted into a recess portion formed in the first fixed iron core. Even in this case, it is easy to regulate the movement of the first movable iron core in the direction orthogonal to the axial direction of the coil with respect to the first fixed iron core and the second fixed iron core. In addition, by lengthening the guide portion in the axial direction, the inclination of the first movable iron core within the filler ring can be inhibited.

In addition, the solenoid may include a pipe attached to the first fixed iron core, and the pipe may be slidably inserted into the inner tubular portion. Even in this case, it is easy to regulate the movement of the first movable iron core in the direction orthogonal to the axial direction of the coil with respect to the first fixed iron core and the second fixed iron core. In addition, by lengthening the fitting length between the pipe and the inner tubular portion, the inclination of the first movable iron core within the filler ring can be inhibited.

In addition, the solenoid may further include an annular filler ring interposed between the first fixed iron core and the second fixed iron core, the first movable iron core may include an inner tubular portion and an outer tubular portion that are doubly disposed inside and outside, a connecting portion connecting first ends of an axial direction of the inner tubular portion and the outer tubular portion, and an inner bottom portion located at a second end of the inner tubular portion, and may be slidably inserted into the filler ring with the inner bottom portion directed to the second fixed iron core side, the second movable iron core may be tubular with a bottom and include an outer bottom portion and an intermediate tubular portion having an inner diameter larger than an outer diameter of the inner tubular portion, the intermediate tubular portion may be slidably inserted into the outer tubular portion with the outer bottom portion directed to the second fixed iron core side, and the spring may be interposed between the inner bottom portion and the first fixed iron core with a first end side inserted into the inner tubular portion.

With the above-described configuration, when the coil is excited, a magnetic path is formed so as to pass through the first fixed iron core, the first movable iron core, the second movable iron core, and the second fixed iron core to attract the first movable iron core to the first fixed iron core and attract the second movable iron core to the second fixed iron core. Furthermore, space for housing the spring can be secured inside the first movable iron core.

In addition, with the above-described configuration, when the first movable iron core moves to the second fixed iron core side, the inner bottom portion of the first movable iron core approaches the outer bottom portion of the second movable iron core. Therefore, when the regulating part is disposed such that the movement in the approaching direction can be regulated, the regulating part can regulate the movement of the first movable iron core to the second fixed iron core side with respect to the second movable iron core, and the regulating part can be easily disposed.

Furthermore, with the above-described configuration, since the second movable iron core is slidably inserted further into the first movable iron core slidably inserted into the filler ring, the first movable iron core does not shift in the radial direction during the movement, and the second movable iron core is not sandwiched between the first movable iron core shifted in the radial direction and the filler ring. Therefore, there is no concern that the second movable iron core is sandwiched between the first movable iron core shifted in the radial direction and the filler ring, and that the sliding resistance during the movement increases.

In addition, a solenoid may be provided in a solenoid valve provided partway in a pressure control passage, the solenoid valve may further include a valve body that opens and closes the pressure control passage in addition to the solenoid, and the solenoid may apply, to the valve body, force to attract the second movable iron core to the second fixed iron core side in a direction of closing the pressure control passage, the force being generated when a current is passed through the coil. This makes it possible to adjust the valve opening pressure of the solenoid valve by changing the current amount supplied to the solenoid, and to set the pressure upstream of the solenoid valve to the valve opening pressure of the solenoid valve.

Furthermore, as described above, the solenoid can increase the thrust force applied to the object as the current amount supplied increases. Therefore, in the above-described solenoid valve, as the current amount supplied to the solenoid increases, the thrust force applied by the solenoid to the valve body in the closing direction increases, and the valve opening pressure of the solenoid valve can be increased. In addition, as described above, in the above-described solenoid, even when no current is passed through the solenoid, the object can be biased by the spring in the same direction as the thrust force when a current is passed. Therefore, in the above-described solenoid valve, the valve opening pressure when no current is passed can be determined according to the specification of the spring.

In addition, the solenoid valve including the solenoid may be provided in a shock absorber, and the shock absorber may include: a cylinder, a rod movably inserted into the cylinder in an axial direction, a main passage through which liquid flows when the cylinder and the rod move relatively in the axial direction, a main valve body that opens and closes the main passage, a pressure introduction passage that is provided with an orifice partway and reduces and leads pressure upstream of the main valve body in the main passage to a back surface of the main valve body, and the pressure control passage connected downstream of the orifice of the pressure introduction passage and provided with the solenoid valve.

With such a configuration, when resistance is given by the main valve body to the flow of liquid passing through the main passage when the cylinder and the rod move relatively in the axial direction, the shock absorber can generate the damping force caused by the resistance. In addition, since the back pressure of the main valve body is set to the valve opening pressure of the solenoid valve, the back pressure of the main valve body can be adjusted by changing the current amount supplied to the solenoid. Then, as the back pressure of the main valve body increases, the main valve body becomes difficult to open, and the generated damping force increases. Therefore, with the above-described configuration, the damping force generated by changing the current amount supplied to the solenoid can be adjusted in magnitude.

Furthermore, as described above, in the above-described solenoid valve, since the valve opening pressure of the solenoid valve can be increased as the current amount supplied to the solenoid increases, in the shock absorber, the back pressure of the main valve body can be increased and the generated damping force can be increased as the current amount supplied to the solenoid is increased. That is, in the shock absorber, since the damping force generated when the current amount supplied to the solenoid is small can be decreased, when the shock absorber is used for vehicle suspension, the power consumption during normal traveling can be decreased. In addition, since heat generation of the solenoid can be inhibited and a change in the temperature of the shock absorber can be decreased accordingly, the change in damping force characteristics caused by the liquid temperature change (characteristics of damping force with respect to piston speed) can be decreased.

In addition, as described above, in the above-described solenoid valve, since the valve opening pressure when no current is passed can be determined according to the specification of the spring, in the above-described shock absorber, the back pressure of the main valve body can be increased even when no current is passed through the solenoid. With this configuration, the shock absorber can prevent the damping force at the time of failure from becoming insufficient. Furthermore, in the above-described shock absorber, it is required at least to provide the pressure control passage as a passage to set the back pressure of the main valve body. Since it is unnecessary to switch the passage for setting the back pressure between when a current is passed and when no current is passed through the solenoid, it is possible to inhibit the structure of the shock absorber from becoming complicated and to reduce the cost.

Advantageous Effects of Invention

The solenoid, the solenoid valve, and the shock absorber of the present invention can decrease the thrust force of the solenoid applied to the object when the current amount supplied to the solenoid is small, and bias the object in the same direction as the thrust force when a current is passed even when no current is passed through the solenoid.

DESCRIPTION OF EMBODIMENTS

Embodiments of the present invention will be described below with reference to the drawings. The same reference signs denoted in some drawings indicate the same components (portions) or corresponding components (portions).

In each embodiment, a solenoid is used for a solenoid valve, the solenoid valve is used for a shock absorber, and the shock absorber is used for suspension of a vehicle. However, the purpose of use of the solenoid according to the present invention, the solenoid valve including the solenoid, and the shock absorber including the solenoid valve is not limited to the above description, and can be changed as appropriate.

First Embodiment

Figure 1:
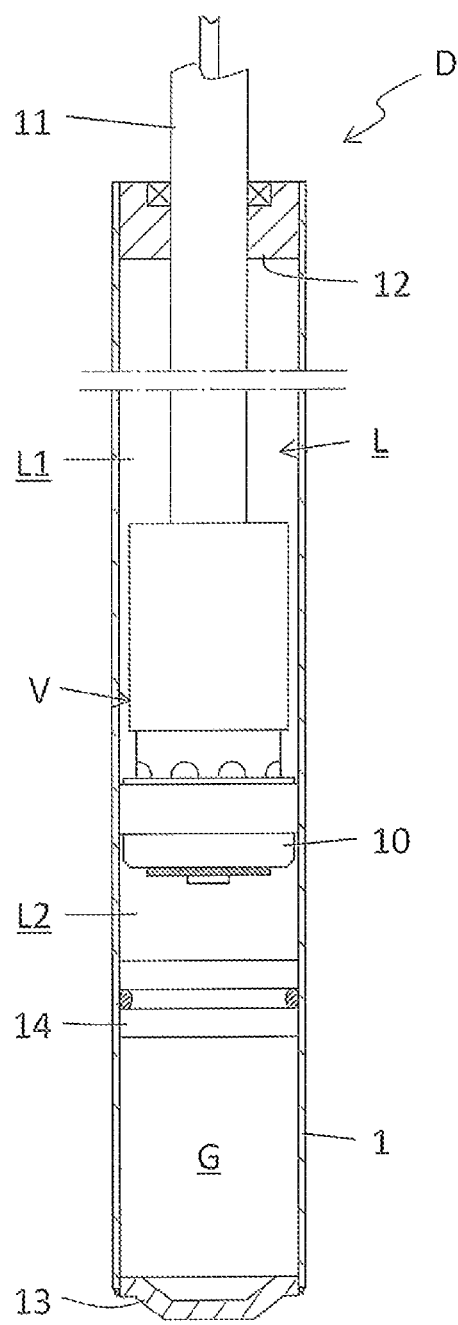
FIG. 1 is a longitudinal cross-sectional view of a shock absorber provided with a solenoid valve including a solenoid according to a first embodiment of the present invention.

As shown in FIG. 1, a shock absorber D provided with a solenoid valve V including a solenoid according to a first embodiment of the present invention includes a cylinder 1, a piston 10 slidably inserted into the cylinder 1, and a piston rod 11 having one end connected to the piston 10 and the other end protruding out of the cylinder 1. The cylinder 1 is connected to one side of a vehicle body and an axle of a vehicle, and the piston rod 11 is connected to the other side. In this way, the shock absorber D is interposed between the vehicle body and the axle.

When the vehicle travels on an uneven road surface or the like and thus wheels vibrate up and down, the piston rod 11 moves into and out of the cylinder 1 to expand and contract the shock absorber D, and the piston 10 moves up and down (axial direction) in FIG. 1 inside the cylinder 1. Note that FIG. 1 shows a state in which the piston rod 11 protrudes upward from the cylinder 1, but the shock absorber D may be attached to the vehicle in any direction.

Next, an annular head member 12 into which the piston rod 11 can be inserted is mounted at one end of the cylinder 1 in the axial direction. The head member 12 slidably supports the piston rod 11 and closes one end of the cylinder 1. Meanwhile, the other end of the cylinder 1 is closed by a bottom cap 13. In this way, the cylinder 1 is hermetically sealed, and the cylinder 1 is filled with liquid and gas.

In more detail, a free piston 14 is slidably inserted into the cylinder 1 opposite to the piston rod 11 when viewed from the piston 10. In addition, a liquid chamber L filled with liquid such as hydraulic oil is formed in the cylinder 1 on the piston 10 side of the free piston 14. Meanwhile, a gas chamber G filled with a compressed gas is formed opposite to the piston 10 when viewed from the free piston 14 in the cylinder 1.

In this way, the liquid chamber L and the gas chamber G in the cylinder 1 are partitioned by the free piston 14. Then, when the piston rod 11 goes in and out of the cylinder 1 while the shock absorber D expands and contracts, the free piston 14 moves up and down in FIG. 1 (axial direction) in the cylinder 1 to expand or contract the gas chamber G to compensate for the volume of the piston rod 11 going in and out of the cylinder 1.

Note that the liquid chamber L and the gas chamber G may be partitioned by a bladder, bellows, or the like in addition to the free piston 14. That is, the configuration of the movable partition wall forming the expandable and contractable gas chamber G is not limited to the free piston 14 and can be appropriately changed. Furthermore, the configuration for compensating for the volume of the piston rod 11 going in and out of the cylinder 1 is not limited to the gas chamber G and can be appropriately changed. For example, instead of the gas chamber G, a reservoir that houses liquid and gas may be provided, and the liquid may be exchanged between the cylinder and the reservoir when the shock absorber expands and contracts. In addition, the shock absorber D may be of the double rod type, and piston rods may be provided on both sides of the piston, in which case the configuration itself for compensating for the piston rod volume can be omitted.

Figure 2:
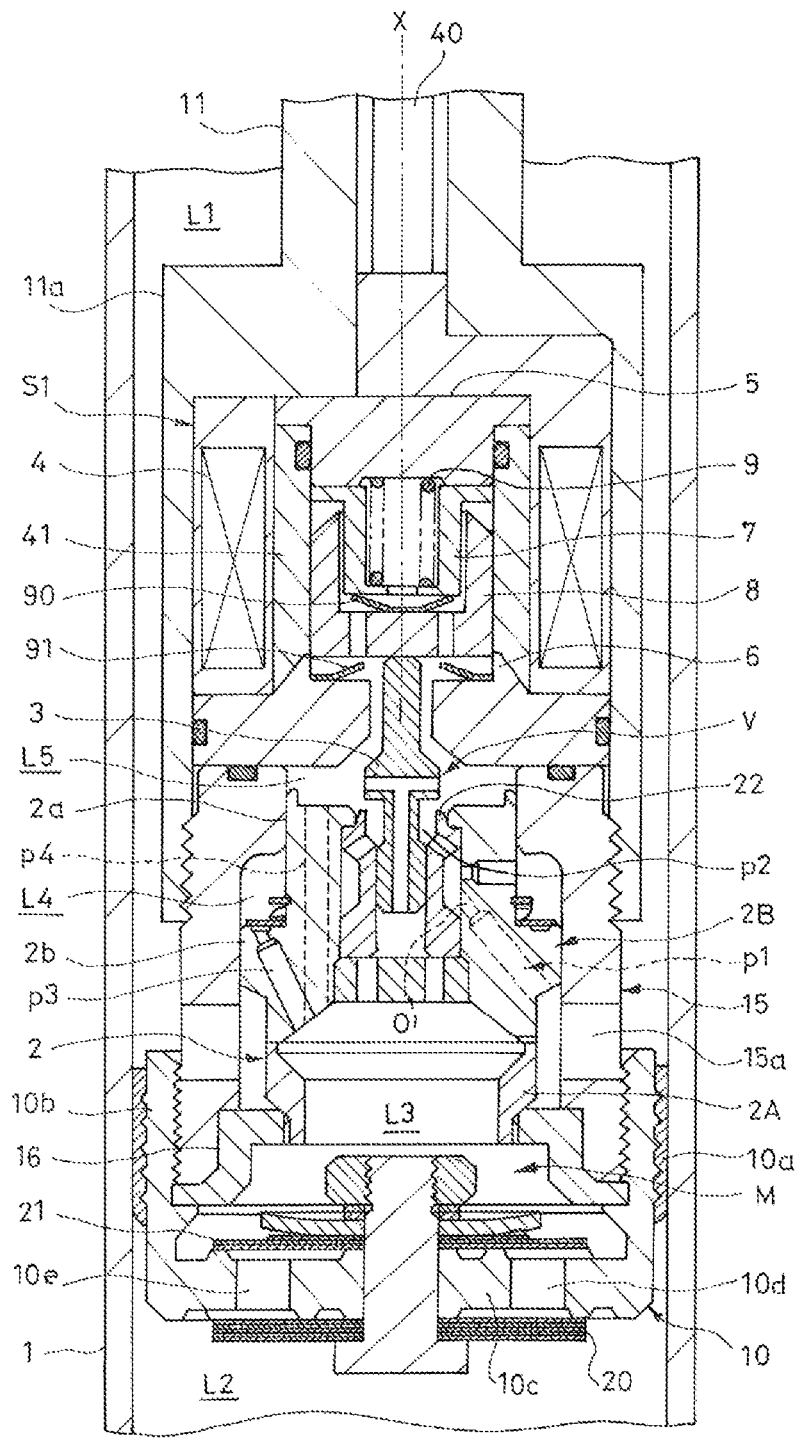
FIG. 2 is an enlarged longitudinal cross-sectional view of the solenoid valve including the solenoid according to the first embodiment of the present invention.

Next, the liquid chamber L in the cylinder 1 is partitioned by the piston 10 into an extension side chamber L1 on the piston rod 11 side and a compression side chamber L2 on the opposite side (opposite to the piston rod side). The piston 10 is tubular with a bottom, as shown in FIG. 2, and includes a tubular portion 10b on which a piston ring 10a in sliding contact with the inner circumference of the cylinder 1 is mounted on the outer circumference, and a bottom portion 10c that closes one end of the tubular portion 10b. Hereinafter, for convenience of description, upper and lower directions in FIG. 2 are simply referred to as "up" and "down", unless otherwise specified.

Then, the piston 10 is disposed with the bottom portion 10c directed downward and the tubular portion 10b directed upward. The tubular portion 10b is connected to a tubular case portion 11a with a ceiling formed at the tip of the piston rod 11 via a tubular guide 15. In addition, an annular valve seat member 16 is fixed between the lower end of the guide 15 and the piston 10. Furthermore, a main valve body 2 that is seated on and unseated from the valve seat member 16 is provided inside the guide 15 so as to allow up-and-down movement.

The main valve body 2 includes a first valve body portion 2A and a second valve body portion 2B that can be separated up and down. An intermediate chamber L3 is formed between the main valve body 2 and the bottom portion 10c of the piston 10. The intermediate chamber L3 is partitioned from the compression side chamber L2 by the piston 10. In addition, extension side and compression side ports 10d and 10e that allow the intermediate chamber L3 to communicate with the compression side chamber L2 are formed in the bottom portion 10c of the piston 10. Furthermore, an extension side valve 20 that opens and closes the outlet of the extension side port 10d is laminated on the lower side of the bottom portion 10c, and a compression side valve 21 that opens and closes the outlet of the compression side port 10e is laminated on the upper side of the bottom portion 10c.

In addition, the inlet of the extension side port 10d opens into the intermediate chamber L3, and pressure in the intermediate chamber L3 acts in the direction of opening the extension side valve 20. Then, when the extension side valve 20 is opened in response to the pressure in the intermediate chamber L3, the liquid in the intermediate chamber L3 goes to the compression side chamber L2 through the extension side port 10d. Meanwhile, the inlet of the compression side port 10e opens into the compression side chamber L2, and pressure in the compression side chamber L2 acts in the direction of opening the compression side valve 21. Then, when the compression side valve 21 is opened in response to the pressure in the compression side chamber L2, the liquid in the compression side chamber L2 goes to the intermediate chamber L3 through the compression side port 10e.

Next, the main valve body 2 includes the first valve body portion 2A and the second valve body portion 2B that can be separated up and down as described above. The first valve body portion 2A has an annular shape, and can be seated on and unseated from the valve seat member 16 while the tip thereof is movably inserted into the valve seat member 16 in the axial direction. Meanwhile, the second valve body portion 2B includes a head portion 2a and a flange portion 2b protruding from the lower end of the head portion 2a to the outer circumference side. Then, while the second valve body portion 2B causes each of the head portion 2a and the flange portion 2b to be in sliding contact with the inner circumference of the guide 15, the lower end thereof can be seated on and unseated from the first valve body portion 2A.

In addition, a through hole 15a that opens into the extension side chamber L1 is formed in the guide 15. The pressure in the extension side chamber L1 acts in a direction of pushing up both the first valve body portion 2A and the second valve body portion 2B to cause the first valve body portion 2A to be unseated from the valve seat member 16. Then, when the first valve body portion 2A moves upward together with the second valve body portion 2B and is unseated from the valve seat member 16 in response to the pressure in the extension side chamber L1, the liquid is the extension side chamber L1 goes to the intermediate chamber L3 through a gap formed between the first valve body portion 2A and the valve seat member 16.

The intermediate chamber L3 is formed on the inner circumference side of the valve seat member 16, the first valve body portion 2A, and the tubular portion 10b of the piston 10, and between the bottom portion 10c of the piston 10 and the second valve body portion 2B. The pressure in the intermediate chamber L3 acts in the direction of pushing down the first valve body portion 2A and in the direction of pushing up the second valve body portion 2B. That is, the pressure in the intermediate chamber L3 acts in the direction of separating the first valve body portion 2A and the second valve body portion 2B up and down, and in the direction of causing the second valve body portion 2B to be unseated from the first valve body portion 2A. Then, when the second valve body portion 2B moves upward in response to the pressure in the intermediate chamber L3 and is unseated from the first valve body portion 2A, the liquid in the intermediate chamber L3 goes to the extension side chamber L1 through a gap formed between the first valve body portion 2A and the second valve body portion 2B, and the through hole 15a.

Summarizing the above, in the present embodiment, a main passage M that allows the extension side chamber L1 to communicate with the compression side chamber L2 is formed by the through hole 15a of the guide 15, the intermediate chamber L3, and the extension side and compression side ports 10d and 10e. Then, the main valve body 2 is provided in the main passage M, and the extension side valve 20 and the compression side valve 21 are provided in series with the main valve body 2.

Next, a back pressure chamber L4 is formed on the upper side of the upper surface of the flange portion 2b, which is a back surface of the main valve body 2. The pressure in the back pressure chamber L4 acts in the direction of pushing down the second valve body portion 2B together with the first valve body portion 2A. In addition, a pressure introduction passage p1 in which an orifice O is provided partway to reduce the pressure in the extension side chamber L1 and lead the pressure to the back pressure chamber L4, a pressure control passage p2 connected downstream of the orifice O of the pressure introduction passage p1, and a decompression passage p3 that allows only the flow of liquid from the intermediate chamber L3 to the back pressure chamber L4 and reduces the pressure in the intermediate chamber L3 to lead the pressure to the back pressure chamber L4 are formed in the second valve body portion 2B.

Then, the solenoid valve V including a solenoid S1 according to the present embodiment is provided partway in the pressure control passage p2 described above. The solenoid valve V includes a spool 3 serving as a valve body that is seated on and unseated from a valve seat 22 provided in the second valve body portion 2B and opens and closes the pressure control passage p2, and the solenoid S1 that gives downward thrust force to the spool 3. Then, when the spool 3 goes downward in response to the thrust force of the solenoid S1, the spool 3 is seated on the valve seat 22 and closes the pressure control passage p2. In this way, the thrust force of the solenoid S1 acts in the direction of closing the spool 3.

Meanwhile, the pressure in the back pressure chamber L4 acts in the direction of pushing up the spool 3. Then, when the pressure in the back pressure chamber L4 increases and upward force caused by the pressure or the like overcomes downward force caused by the solenoid S1 or the like, the spool 3 moves upward and is unseated from the valve seat 22 to open the pressure control passage p2. That is, the pressure in the back pressure chamber L4 acts in the direction of opening the spool 3, and when the pressure in the back pressure chamber L4 reaches the valve opening pressure of the spool 3, the spool 3 opens the pressure control passage p2. In this way, the spool 3 being seated on and unseated from the valve seat 22 to open and close the pressure control passage p2 is also referred to as the solenoid valve V opening and closing.

In addition, in the present embodiment, when the solenoid valve V is opened, the liquid in the back pressure chamber L4 flows out through the pressure control passage p2 to an upper gap L5 formed between the head portion 2a of the second valve body portion 2B and the solenoid S1. The upper gap L5 communicates with the intermediate chamber L3 by a communication passage p4 formed in the second valve body portion 2B. When the solenoid valve V is opened accordingly, the liquid goes from the back pressure chamber L4 to the upper gap L5 through the pressure control passage p2, and goes from the upper gap L5 to the intermediate chamber L3 through the communication passage p4. Furthermore, the communication passage p4 makes the pressure in the upper gap L5 and the pressure in the intermediate chamber L3 substantially the same.

Next, the solenoid S1 according to the present embodiment includes a coil 4 housed along the axial direction in the case portion 11a of the piston rod 11, a first fixed iron core 5 disposed above the coil 4, a second fixed iron core 6 disposed below the coil 4 with a gap with the first fixed iron core 5, a first movable iron core 7 and a second movable iron core 8 disposed in an up-and-down movable manner between the first fixed iron core 5 and the second fixed iron core 6, a spring 9 that biases the first movable iron core 7 downward, a leaf spring 90 that limits the amount of downward movement of the first movable iron core 7 with respect to the second movable iron core 8, and a leaf spring 91 that limits the amount of downward movement of the second movable iron core 8.

Here, the direction along the center line X passing through the center of the coil 4 is the axial direction of the coil 4, and up and down mentioned here correspond to both sides of the axial direction of the coil 4. Therefore, it can be said that the first fixed iron core 5 is disposed on one end side of the axial direction of the coil 4, and that the second fixed iron core 6 is disposed on the other end side of the axial direction of the coil 4. In addition, it can be said that the spring 9 biases the first movable iron core 7 to the second fixed iron core 6 side, the leaf spring 90 functions as a regulating part that regulates the movement of the first movable iron core 7 to the second fixed iron core 6 side with respect to the second movable iron core 8, and the leaf spring 91 functions as a regulating part that regulates the movement of the second movable iron core 8 to the second fixed iron core 6 side.

Each part constituting the solenoid S1 according to the present embodiment will be described in detail below.

The coil 4 is integrated with a harness 40 for passage of current by a mold resin. The harness 40 extends through the inside of the piston rod 11 to the outside of the shock absorber D and is connected to a power source. In addition, the first fixed iron core 5, the second fixed iron core 6, the first movable iron core 7, and the second movable iron core 8 each include a magnetic material. The passage of current through the coil 4 generates a magnetic flux. The magnetic flux flows in the path of the first fixed iron core 5, the first movable iron core 7, the second movable iron core 8, the second fixed iron core 6, and the case portion 11a. The first movable iron core 7 is attracted upward toward the first fixed iron core 5, and the second movable iron core 8 is attracted downward toward the second fixed iron core 6.

An annular tiller ring 41 including a non-magnetic material is interposed between the first fixed iron core 5 and the second fixed iron core 6. A magnetic gap between the first fixed iron core 5 and the second fixed iron core 6 is formed by the filler ring 41. In addition, the first movable iron core 7 and the second movable iron core 8 are disposed inside the filler ring 41. The first movable iron core 7 and the second movable iron core 8 are both tubular with a bottom. The first movable iron core 7 is inserted into the second movable iron core 8 in an up-and-down movable way (axial direction). The second movable iron core 8 is inserted into the filler ring 41 in an up-and-down movable way (axial direction).

Figure 3:
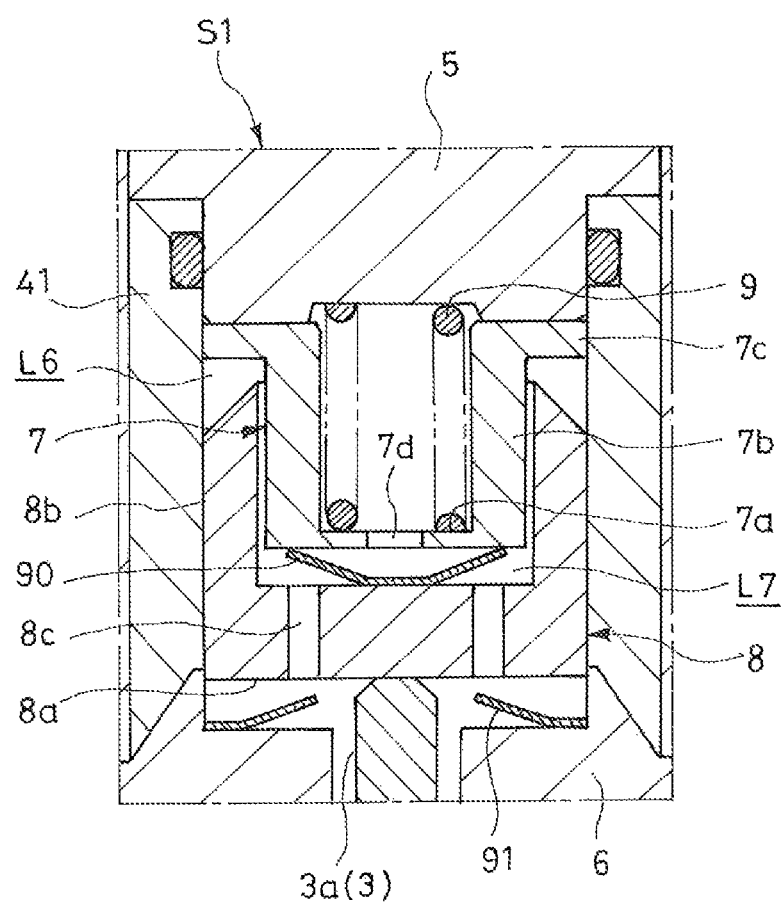
FIG. 3 is a partially enlarged cross-sectional view of the solenoid according to the first embodiment of the present invention.

As shown in FIG. 3, the second movable iron core 8 which is an outer tube, includes an outer bottom portion 8a and an outer tubular portion 8b standing on the outer circumference edge of the outer bottom portion 8a. The outer bottom portion 8a is directed downward (second fixed iron core 6 side), and the outer tubular portion 8b is in sliding contact with the inner circumference of the filler ring 41. Meanwhile, the first movable iron core 7, which is an inner tube, includes an inner bottom portion 7a, an inner tubular portion 7b standing on the outer circumference edge of the inner bottom portion 7a, and an annular guide portion 7c located on the outer circumference of the tip of the inner tubular portion 7b. The inner tubular portion 7b is inserted into the outer tubular portion 8b with the inner bottom portion 7a directed downward. (second fixed iron core 6 side), and the guide portion 7c protruding upward from the outer tubular portion 8b is in sliding contact with the inner circumference of the filler ring 41.

In the inner bottom portion 7a of the first movable iron core 7, a communication hole 7d penetrating the wall thickness is formed, and liquid can move through the communication hole 7d relatively without resistance. Accordingly, the liquid is not trapped on the upper side of the first movable iron core 7 (first fixed iron core 5 side), and the smooth up-and-down movement of the first movable iron core 7 is ensured. The spring 9 is inserted into the inner tubular portion 7b of the first movable iron core 7. In the present embodiment, the spring 9 is a coil spring, and one end of the spring 9 hits the inner bottom portion 7a. Meanwhile, the other end of the spring 9 is supported by the first fixed iron core 5, and the spring 9 biases the first movable iron core 7 downward.

In addition, the inner diameter of the outer tubular portion 8b in the second movable iron core 8 is larger than the outer diameter of the inner tubular portion 7b in the first movable iron core 7. An annular gap is formed between the outer tubular portion 8b and the inner tubular portion 7b, and the liquid can move through the gap relatively without resistance. In addition, in the outer bottom portion 8a of the second movable iron core 8, a communication hole 8c penetrating the wall thickness is formed, and the liquid can move through the communication hole 8c relatively without resistance. Accordingly, it is possible to inhibit that the liquid is trapped in space L6 formed above the tip of the outer tubular portion 8b (first fixed iron core 5 side) or space L7 formed above the outer bottom portion 8a (first fixed iron core 5 side), and that damping force that hinders the movement of the second movable iron core 8 is generated.

Furthermore, in the present embodiment, since the first movable iron core 7 moves up and down (axial direction) while the guide portion 7c is supported by the filler ring 41, the first movable iron core 7 is not eccentric from the filler ring 41 during the movement. Since the filler ring 41 is sandwiched between the first fixed iron core 5 and the second fixed iron core 6 and is fixedly provided with respect thereto, the filler ring 41 prevents the first movable iron core 7 from shifting in a direction orthogonal to the center line X of the coil 4 (radial direction). This can prevent the first movable iron core 7 from radially shifting during the movement and sandwiching the outer tubular portion 8b of the second movable iron core 8 with the filler ring 41, thereby increasing friction when the second movable iron core 8 moves. This ensures smooth up-and-down movement of the second movable iron core 8.

Next, the leaf springs 90 and 91 that function as regulating parts are disposed above and below the outer bottom portion 8a of the second movable iron core 8. In more detail, the upper leaf spring 90, which is a first regulating part, is located between the outer bottom portion 8a of the second movable iron core 8 and the inner bottom portion 7a of the first movable iron core 7 facing the outer bottom portion 8a up and down. The lower leaf spring 91, which is a second regulating part, is located between the outer bottom portion 8a of the second movable iron core 8 and the second fixed iron core 6 facing the outer bottom portion 8a up and down.

In addition, the upper leaf spring 90 includes a ring plate-shaped seat portion laminated on the outer bottom portion 8a of the second movable iron core 8, and a plurality of legs extending radially from this seat portion to the outer circumference side and standing diagonally upward. Meanwhile, the lower leaf spring 91 includes an annular seat portion laminated on the second fixed iron core 6, and a plurality of legs extending to the inner circumference side from the seat portion and standing diagonally upward. In this way, the upper and lower leaf springs 90 and 91 each include a plurality of legs, and a gap is formed between the adjacent legs, and therefore the leaf springs 90 and 91 do not hinder the flow of liquid.

Then, when the first movable iron core 7 moves downward toward the second movable iron core 8, the inner bottom portion 7a of the first movable iron core 7 hits the leaf spring 90. Then, the downward movement of the first movable iron core 7 toward the second movable iron core 8 is regulated, and after that, the first movable iron core 7 moves downward integrally with the second movable iron core 8. In addition, when the second movable iron core 8 moves downward, the outer bottom portion 8a of the second movable iron core 8 hits and compresses the leaf spring 91, and does not move downward further.

A through hole is formed in the center of the second fixed iron core 6, and a shaft portion 3a of the spool 3 is movably inserted into the through hole. Then, the tip of the shaft portion 3a hits the outer bottom portion 8a of the second movable iron core 8. Accordingly, in a state where the passage of current through the coil 4 is cut off, the first movable iron core 7 goes downward in response to the biasing force of the spring 9, and hits the second movable iron core 8 via the leaf spring 90. Therefore, the spool 3 receives downward force by the biasing force of the spring 9. Meanwhile, when a current is passed through the coil 4, the first movable iron core 7 is attracted to the first fixed iron core 5, and the second movable iron core 8 is attracted to the second fixed iron core 6, then the spring 9 is compressed by the first movable iron core 7 and the biasing force is not transmitted to the spool 3, but the spool 3 receives downward force caused by force that attracts the second movable iron core 8.

In addition, the leaf spring 90, which is the first regulating part, regulates an approach of the inner bottom portion 7a of the first movable iron core 7 and the outer bottom portion 8a of the second movable iron core 8 facing the inner bottom portion 7a up and down (axial direction) to prevent the first movable iron core 7 from adsorbing the second movable iron core 8 when a current is passed through the coil 4. Similarly, the leaf spring 91, which is the second regulating part, regulates an approach of the outer bottom portion 8a of the second movable iron core 8 and the second fixed iron core 6 facing the outer bottom portion 8a up and down (axial direction) to prevent the second movable iron core 8 from adsorbing the second fixed iron core 6 when a current is passed through the coil 4.

Note that the first and second regulating parts are not limited to the leaf springs 90 and 91, respectively, and may be a ring or sheet of a non-magnetic material such as rubber, synthetic resin, or aluminum. In such a case, the ring or sheet is preferably disposed on the outer circumference side of the entrance of the communication holes 7d and 8c or the like so as not to hinder the flow of liquid. Furthermore, when the movement of the first movable iron core 7 with respect to the second movable iron core 8 and the movement of the second movable iron core 8 with respect to the second fixed iron core 6 are not hindered when a current is passed, the first and second regulating parts may be magnetic materials. Part of the first movable iron core 7 or the second movable iron core 8 may function as the first regulating part, and part of the second movable iron core 8 or the second fixed iron core 6 may function as the second regulating part.

Meanwhile, no regulating part is provided between the first fixed iron core 5 and the first movable iron core 7. When a current is passed through the coil. 4, the first movable iron core 7 is adsorbed by the first fixed iron core 5. In this way, when the first movable iron core 7 is adsorbed by the first fixed iron core 5 when a current is passed through the coil 4, the first movable iron core 7 compresses the spring 9. The posture of the first movable iron core 7 that prevents the biasing force of the spring 9 from being transmitted to the second movable iron core 8 side can be stably maintained. However, the first movable iron core 7 does not necessarily have to be adsorbed by the first fixed iron core 5 when a current is passed through the coil 4.

Figure 4:
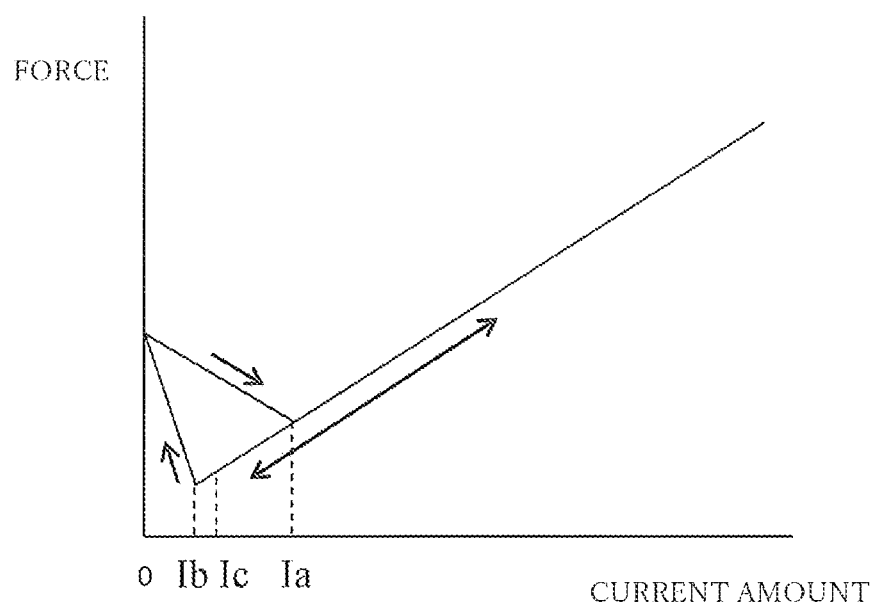
FIG. 4 is a characteristic diagram showing a relationship between a supply current amount in the solenoid according to the first embodiment of the present invention and force acting in a direction of pushing down a valve body.

Next, FIG. 4 shows the relationship between the current amount supplied to the solenoid S1 and the force applied by the solenoid S1 to the spool 3. In FIG. 4, Ia is the minimum current amount required to adsorb the first movable iron core 7 separated from the first fixed iron core 5 by the first fixed iron core 5, and Ib is the minimum current amount required to maintain the adsorption state of the first fixed iron core 5 and the first movable iron core 7 after the first movable iron core 7 is adsorbed by the first fixed iron core 5. Note that Ic will be described later.

To begin with, when the current amount supplied to the coil 4 is zero, that is, when no current is passed through the solenoid S1, the first movable iron core 7 is pushed down by the biasing force of the spring 9 and hits the second movable iron core 8 via the leaf spring 90, and the second movable iron core 8 is pushed down together with the spool 3. In this way, when no current is passed through the solenoid S1, the spool 3 receives downward force by the spring 9 via the second movable iron core 8, the leaf spring 90, and the first movable iron core 7. That is, when no current is passed through the solenoid S1, the solenoid S1 applies downward force caused by the biasing force of the spring 9 to the spool 3.

Next, when increasing the current amount supplied to the solenoid S1, the upward force that attracts the first movable, iron core 7 to the first fixed iron core 5 increases, and the downward force that attracts the second movable iron core 8 to the second fixed iron core 6 also increases. In such a case, in the region where the current amount supplied to the solenoid S1 is less than Ia, although the biasing force of the spring 9 is transmitted to the spool 3, part of the force of the spring 9 that biases the first movable iron core 7 downward is offset by the force that attracts the first movable iron core upward. (first fixed iron core 5 side). Therefore, in the region where the current amount is less than Ia, the downward force applied by the solenoid S1 to the spool 3 decreases as the current amount supplied to the solenoid S1 increases.

Meanwhile, in a case where the current amount supplied to the solenoid S1 increases, in the region where the current amount is Ia or more, the first movable iron core 7 is attracted and adsorbed by the first fixed iron core 5 against the biasing force of the spring 9. In such a state, the biasing force of the spring 9 is not transmitted to the second movable iron core 8, and only the force that attracts the second movable iron core 8 to the second fixed iron core 6 acts in the direction of pushing down the spool 3. Since the downward force that attracts the second movable iron core 8 increases in proportion to the current amount supplied to the solenoid S1, in the region where the current amount supplied to the solenoid S1 is Ia or more, as the current amount supplied to the solenoid S1 increases, the downward force applied by the solenoid S1 to the spool 3 increases in proportion to the current amount.

Conversely, when reducing the current amount supplied to the solenoid S1 from the state where the first movable iron core 7 is adsorbed by the first fixed iron core 5 and the biasing force of the spring 9 is not transmitted to the second movable iron core 8, the upward force that attracts the first movable iron core 7 to the first fixed iron core 5 decreases, and the downward force that attracts the second movable iron core 8 to the second fixed iron core 6 also decreases. Even in such a case, in the region where the current amount supplied to the solenoid S1 is Ib or more, the state in which the first movable iron core 7 is adsorbed by the first fixed iron core 5 and the biasing force of the spring 9 is not transmitted to the second movable iron core 8 is maintained. Therefore, in the region where the current amount supplied to the solenoid S1 is Ib or more, as the current amount supplied to the solenoid S1 decreases, the downward force applied by the solenoid S1 to the spool 3 decreases in proportion to the current amount.

Meanwhile, in the case of reducing the current amount supplied to the solenoid S1 from the state where the first movable iron core 7 is adsorbed by the first fixed iron core 5 and the biasing force of the spring 9 is not transmitted to the second movable iron core 8, when the current amount becomes less than Ib, the biasing force of the spring 9 releases the adsorption state of the first movable iron core 7 and the first fixed iron core 5, and the biasing force of the spring 9 is transmitted to the second movable iron core 8. Therefore, in the region where the current amount is less than Ib, the downward force applied by the solenoid S1 to the spool 3 increases as the current amount supplied to the solenoid S1 decreases.

As can be seen from FIG. 4, Ib, which is the minimum current amount required to maintain the adsorption of the first movable iron core 7 and the first fixed iron core 5, is less than Ia, which is the minimum current amount required to adsorb the separated first movable iron core 7 to the first fixed iron core 5 (Ia>Ib). Therefore, the characteristic of the force applied by the solenoid S1 to the spool 3 with respect to the current amount supplied to the solenoid S1 has hysteresis. Note that in FIG. 4, in order to facilitate understanding, the region where the current amount supplied to the solenoid S1 is small exaggerated.

In the present embodiment, when the current amount supplied to the solenoid S1 controlled to control the force applied by the solenoid S1 to the spool 3, after once supplying a current of Ia or more and adsorbing the first movable iron core 7 by the first fixed iron core 5, the current amount supplied to the solenoid S1 is controlled in a range of Ic or more, which is larger than Ib. Accordingly, in normal times when the current amount flowing to the solenoid S1 is controlled, the state where the first movable iron core 7 is adsorbed by the first fixed iron core 5 is maintained. Therefore, the current amount supplied to the solenoid S1 and the downward force applied by the solenoid S1 to the spool 3 are in a proportional relationship, and the force increases as the current amount supplied to the solenoid S1 increases.

In normal times (during control), the force applied by the solenoid S1 to the spool 3 caused by the magnetic force generated by the passage of current through the solenoid S1 is referred to as "thrust force" of the solenoid S1. That is, the thrust force of the solenoid S1 is controlled by controlling the current amount supplied to the solenoid S1. In addition, in the present embodiment, the relationship between the current amount supplied to the solenoid S1 and the thrust force applied to the spool 3 by the solenoid S1 is a proportional relationship. The thrust force increases as the supply current amount increases, and the thrust force decreases as the supply current amount decreases.

Meanwhile, at the time of failure when the passage of current through the solenoid S1 is cut off, the spool 3 is biased downward by the spring 9 of the solenoid S1, and the biasing force is determined in advance according to the specification of the spring 9 such as the spring constant. In addition, the direction of the biasing force of the spring 9 that biases the spool 3 at the time of failure (when no current is passed) is the same as the direction of the thrust force applied to the spool 3 in normal times.

The operation of the shock absorber D provided with the solenoid valve V including the solenoid S1 according to the present embodiment will be described below.

When the shock absorber D is extended and the piston 10 moves upward the cylinder 1 to compress the extension side chamber L1 and increase the pressure in the extension side chamber L1, the liquid in the extension side chamber L1 flows into the back pressure chamber L4 through the pressure introduction passage p1, and the pressure in the back pressure chamber L4 increases. Then, when the pressure in the back pressure chamber L4 reaches the valve opening pressure of the spool 3, the spool 3 (solenoid valve V) opens, and the liquid in the back pressure chamber L4 goes through the pressure control passage p2, the upper gap L5, and the communication passage p4 to the intermediate chamber L3. Accordingly, when the shock absorber D is extended, the pressure in the back pressure chamber L4 is controlled to be the valve opening pressure of the solenoid valve V.

Meanwhile, when the upward force caused by the Pressure or the like in the extension side chamber L1 acting on the first valve body portion 2A and the second valve body portion 2B exceeds the downward force caused by the pressure or the like of the back pressure chamber L4 when the shock absorber D is extended, the first valve body portion 2A and the second valve body portion 2B move upward. Then, a gap is formed between the first valve body portion 2A and the valve seat member 16. The liquid in the extension side chamber L1 moves through the gap to the intermediate chamber L3, and the liquid in the intermediate chamber L3 opens the extension side valve 20 and moves to the compression side chamber L2.

In this way, when the shock absorber D expands, the first valve body portion 2A and the extension side valve 20 in the main valve body 2 are opened. Resistance is given by the main valve body 2 and the extension side valve 20 to the flow of liquid in the main passage M from the extension side chamber L1 to the compression side chamber L2. Therefore, when the shock absorber D expands, the pressure in the extension side chamber L1 increases and the shock absorber D exerts extension side damping force that hinders the extension operation.

Meanwhile, in normal times when the current amount flowing through the solenoid S1 is controlled, as the current amount supplied to the solenoid S1 increases, the thrust force of the solenoid S1 acting downward (closing direction) on the spool 3 increases. Therefore, as the current amount supplied to the solenoid S1 increases, the valve opening pressure of the spool 3 (solenoid valve V) increases, which increases the pressure in the back pressure chamber L4.

Furthermore, since the pressure in the back pressure chamber L4 acts downward (closing direction) on the second valve body portion 2B and the first valve body portion 2A, as the current amount supplied to the solenoid S1 is increased to increase the pressure in the back pressure chamber L4, the valve opening pressure of the first valve body portion 2A in the main valve body 2 increases, and the generated extension side damping force increases. In this way, in normal times, by adjusting the valve opening pressure of the spool 3 with the solenoid S1, the extension side damping force is adjusted in magnitude. Note that FIGS. 2 and 3 show a state where the spool 3 is opened in normal times.

Meanwhile, at the time of failure when the passage of current through the solenoid S1 is cut off, the valve opening pressure of the spool 3 (solenoid valve V) is determined according to the biasing force of the spring 9. Therefore, the pressure in the back pressure chamber L4 at the time of failure is determined according to the specification of the spring 9, and the extension side damping force generated accordingly is determined. As described above, in normal times, since the biasing force of the spring 9 is not transmitted to the spool 3, the specification of the spring 9 can be arbitrarily set without considering the extension side damping force in normal times.

Conversely, when the piston 10 moves downward in the cylinder 1 to compress the compression side chamber L2 and the pressure in the compression side chamber L2 increases while the shock absorber D contracts, the liquid in the compression side chamber L2 opens the compression side valve 21 and moves to the intermediate chamber L3, and the liquid in the intermediate chamber L3 moves through the decompression passage p3 to the back pressure chamber L4. At this time, the pressure in the upper gap L5 located downstream of the spool 3 is substantially the same as the pressure in the intermediate chamber L3, and is higher than the pressure in the back pressure chamber L4 located upstream of the spool 3. Therefore, the spool 3 is maintained in the closed state. Then, in such a state, the thrust force of the solenoid S1 acts downward on the second valve body portion 2B via the spool 3.

In addition, as described above, since the pressure in the intermediate chamber L3 acts upward only on the second valve body portion 2B, when the upward force caused by the pressure or the like in the intermediate chamber L3 acting on the second valve body portion 2B exceeds the downward force caused by the thrust force or the like of the solenoid S1, only the second valve body portion 2B moves upward. Then, a gap is formed between the second valve body portion 2B and the first valve body portion 2A, and the liquid in the intermediate chamber L3 moves through the gap to the extension side chamber L1.

In this way, when the shock absorber D contracts, the compression side valve 21 and the second valve body portion 2B in the main valve body 2 open, and resistance is given by the compression side valve 21 and the main valve body 2 to the flow of liquid in the main passage M from the compression side chamber L2 to the extension side chamber L1. Therefore, when the shock absorber D contracts, the pressure in the compression side chamber L2 increases, and the shock absorber D exerts the compression side damping force that hinders the contraction operation.

In addition, in normal times when the current amount flowing through the solenoid S1 is controlled, as the current amount supplied to the solenoid S1 is increased to increase the thrust force of the solenoid S1, the downward (closing direction) force acting on the second valve body portion 2B increases. Therefore, as the current amount supplied to the solenoid S1 is increased to increase the thrust force of the solenoid S1, the valve opening pressure of the second valve body portion 2B in the main valve body 2 increases, and the generated pressure side damping force increases. In this way, in normal times, by adjusting the force that pushes the second valve body portion 2B downward through the spool 3 by the solenoid S1, the compression side damping force is adjusted in magnitude.

Meanwhile, at the time of failure when the passage of current through the solenoid S1 is cut off, the biasing force of the spring 9 is transmitted to the second valve body portion 2B via the spool 3. Therefore, the compression side damping force at the time of failure is also determined according to the specifications of the spring 9. As described above, in normal times, since the biasing force of the spring 9 is not transmitted to the spool 3, the specification of the spring 9 can be arbitrarily set without considering the compression side damping force in normal times.

The action and effect of the solenoid S1 according to the present embodiment, the solenoid valve V provided with the solenoid S1, and the shock absorber D provided with the solenoid valve V including the solenoid S1 will be described below.

The solenoid S1 according to the present embodiment includes the coil 4, the first fixed iron core 5 located on a first end side of the axial direction of the coil 4, the second fixed iron core 6 located on a second end side of the axial direction of the coil 4 with a gap with the first fixed iron core 5, the first movable iron core 7 disposed between the first fixed iron core 5 and the second fixed iron core 6 and attracted by the first fixed iron core 5 by the passage of current through the coil 4, the second movable iron core 8 disposed between the first fixed iron core 5 and the second fixed iron core 6 and attracted by the second fixed iron core 6 by the passage of current through the coil 4, the spring 9 that biases the first movable iron core 7 to the second fixed iron core 6 side, and the leaf spring (regulating part) 90 that regulates the movement of the first movable iron core 7 to the second fixed iron core 6 side with respect to the second movable iron core 8. Then, the movement of the first movable iron core 7 in a direction orthogonal to the axial direction of the coil 4 with respect to the first fixed iron core 5 and the second fixed iron core 6 is regulated.

With the above-described configuration, when the first movable iron core 7 goes to the second fixed iron core 6 side in response to the biasing force of the spring 9 and the leaf spring 90 regulates the movement of the first movable iron core 7 to the second fixed iron core 6 side with respect to the second movable iron core 8 when no current is passed through the solenoid S1, the first movable iron core 7 and the second movable iron core 8 integrally move to the second fixed iron core 6 side. Therefore, when no current is passed through the solenoid S1, the biasing force of the spring 9 is transmitted to the second movable iron core 8 via the first movable iron core 7 and the leaf spring 90.

Meanwhile, when the first movable iron core 7 is attracted by the first fixed iron core 5 and moves in the attraction direction when a current is passed through the solenoid S1, the spring 9 is compressed by the first movable iron core 7, and the biasing force of the spring 9 is not transmitted to the second movable iron core 8. In addition, when a current is passed through the solenoid S1, the second movable iron core 8 is attracted by the second fixed iron core 6, and as the current amount supplied to the solenoid S1 increases, the force that attracts the second movable iron core 8 to the second fixed iron core 6 increases.

Therefore, when the force that attracts the second movable iron core 8 is applied to the object such as the spool 3 as thrust force when a current is passed through the solenoid S1, as the current amount supplied to the solenoid S1 increases, the thrust force applied to the object increases, and as the current amount supplied to the solenoid S1 decreases, the thrust force applied to the object can be decreased. Furthermore, when no current is passed, the biasing force of the spring 9 acts on the object via the first movable iron core 7, the leaf spring (regulating part) 90, and the second movable iron core 8. Since the direction of the biasing force of the spring 9 is the same as the direction of the force that attracts the second movable iron core 8 when a current is passed through the solenoid S1, with the above-described configuration, even when no current is passed through the solenoid S1, the object can be biased in the same direction as when a current is passed.

In addition, with the above-described configuration, as described above, when the first movable iron core 7 moves to the first fixed iron core 5 side against the biasing force of the spring 9 when a current is passed through the solenoid S1, the biasing force of the spring 9 is not transmitted to the second movable iron core 8 and thus is not transmitted to the spool (object) 3. Therefore, the thrust force of the solenoid S1 when a current is passed and the biasing force applied to the object by the spring 9 when no current is passed can be arbitrarily set individually. Note that in the present embodiment, the spring 9 is a coil spring, but may be a spring other than the coil spring such as a disc spring.

In addition, the movement of the first movable iron core 7 of the solenoid S1 of the present embodiment in a direction orthogonal to the axial direction of the coil 4 (direction along the center line X of the coil 4) with respect to the first fixed iron core 5 and the second fixed iron core 6 is regulated. In other words, the first movable iron core 7 does not move in the radial direction of the coil 4 with respect to the first fixed iron core 5 and the second fixed iron core 6. Accordingly, the movement of the second movable iron core 8 is not hindered by the first movable iron core 7 shifted in the radial direction, and the smooth up-and-down movement of the second movable iron core 8 can be ensured. As a result, as described above, when the force that attracts the second movable iron core 8 is applied to the object as the thrust force, hysteresis can be inhibited in the characteristics of the thrust force with respect to the current amount supplied to the solenoid S1, and the thrust force can be controlled easily.

In addition, the solenoid S1 according to the present embodiment includes the annular filler ring 41 interposed between the first fixed iron core 5 and the second fixed iron core 6. Then, the second movable iron core 8 is tubular with a bottom and includes the outer bottom portion 8a and the outer tubular portion 8b standing on the outer circumference edge of the outer bottom portion 8a. The second movable iron core 8 is movably inserted into the filler ring 41 in the axial direction with the outer bottom portion 6a directed to the second fixed iron core 6 side. Furthermore, the first movable iron core 7 is also tubular with a bottom and includes the inner bottom portion 7a and the inner tubular portion 7b standing on the outer circumference edge of the inner bottom portion 7a and having an outer diameter smaller than the inner diameter of the outer tubular portion 8b. The inner tubular portion 7b is movably inserted into the outer tubular portion 8b of the second movable iron core 8 in the axial direction with the inner bottom portion 7a directed to the second fixed iron core 6 side. In addition, the spring 9 is interposed between the inner bottom portion 7a and the first fixed iron core 5 with one end side inserted into the inner tubular portion 7b of the first movable iron core 7.

With the above-described configuration, when the coil 4 is excited, a magnetic path is formed so as to pass through the first fixed iron core 5, the first movable iron core 7, the second movable iron core 8, and the second fixed iron core 6 to attract the first movable iron core 7 to the first fixed iron core 5 and attract the second movable iron core 8 to the second fixed iron core 6. Furthermore, since the first movable iron core 7 and the second movable iron core 8 can be made small while securing housing space for the spring 9 inside the first movable iron core 7, the solenoid S1 can be made small.

In addition, with the above-described configuration, when the first movable iron core 7 moves to the second fixed iron core 6 side, the inner bottom portion 7a of the first movable iron core 7 approaches the outer bottom portion 8a of the second movable iron core 8. Therefore, if the leaf spring (regulating part) 90 is disposed such that the movement in the approaching direction can be regulated, the movement of the first movable iron core 7 to the second fixed iron core 6 side with respect to the second movable iron core 8 can be regulated. Then, to dispose the leaf spring 90 in this way, for example, the leaf spring 90 is required at least to be disposed between the inner bottom portion 7a and the outer bottom portion 8a as in the present embodiment, which is easy to implement. That is, with the above-described configuration, the leaf spring (regulating part) 90 can be easily disposed.

Furthermore, in the solenoid S1, the outer tubular portion 8b of the second movable iron core 8 is located between the inner tubular portion 7b of the first movable iron core 7 and the filler ring 41. As described above, the movement of the first movable iron core 7 in the radial direction (direction orthogonal to the axial direct ion of coil 4) with respect to the first fixed iron core 5 and the second fixed iron core 6 is regulated. In addition, the filler ring 41 is interposed between the first fixed iron core 5 and the second fixed iron core 6, and is provided fixedly to these iron cores. Therefore, with the solenoid S1, when adsorbed by the first fixed iron core 5, the first movable iron core 7 does not shift radially with respect to the filler ring 41. Therefore, with the solenoid S1, it is possible to prevent the outer tubular portion 8b of the second movable iron core 8 from being sandwiched between the first movable iron core 7 shifted in the radial direction and the filler ring 41, to prevent sliding resistance during the movement from increasing, and to prevent smooth up-and-down movement of the second movable iron core 8 from being hindered.

In addition, the first movable iron core 7 of the solenoid S1 according to the present embodiment includes the guide portion 7c located at the outer circumference of the tip of the inner tubular portion 7b protruding outward from the outer tubular portion 8b of the second movable iron core 8 and sliding contact with the inner circumference of the filler ring 41. In this case, the sliding gap formed between the filler ring 41 and the guide portion 7c is very narrow, and narrower than the gap formed between the outer tubular portion 8b and the inner tubular portion 7b. In other words, the difference between the inner diameter of the filler ring 41 and the outer diameter of the guide portion 7c is smaller than the difference between the inner diameter of the outer tubular portion 8b and the outer diameter of the inner tubular portion 7b.

With the above-described configuration, by the filler ring 41 supporting the guide portion 7c of the first movable iron core 7, it is possible to prevent the first movable iron core 7 from shifting in the radial direction (direction orthogonal to the axial direction of the coil 4) with respect to the first fixed iron core 5 and the second fixed iron core 6, and to simplify the configuration for preventing the shift. Furthermore, with the above-described configuration, when the axial length of the guide portion 7c fitted to the filler ring 41, that is, the fitting length of the filler ring 41 and the guide portion 7c is lengthened, it is possible to prevent the first movable iron core 7 from inclining within the filler ring 41 and hindering the smooth up-and-down movement of the second movable iron core 8. Therefore, with the solenoid S1, it is possible to more surely prevent the first movable iron core 7 from hindering the smooth up-and-down movement of the second movable iron core 8.

Figure 5:
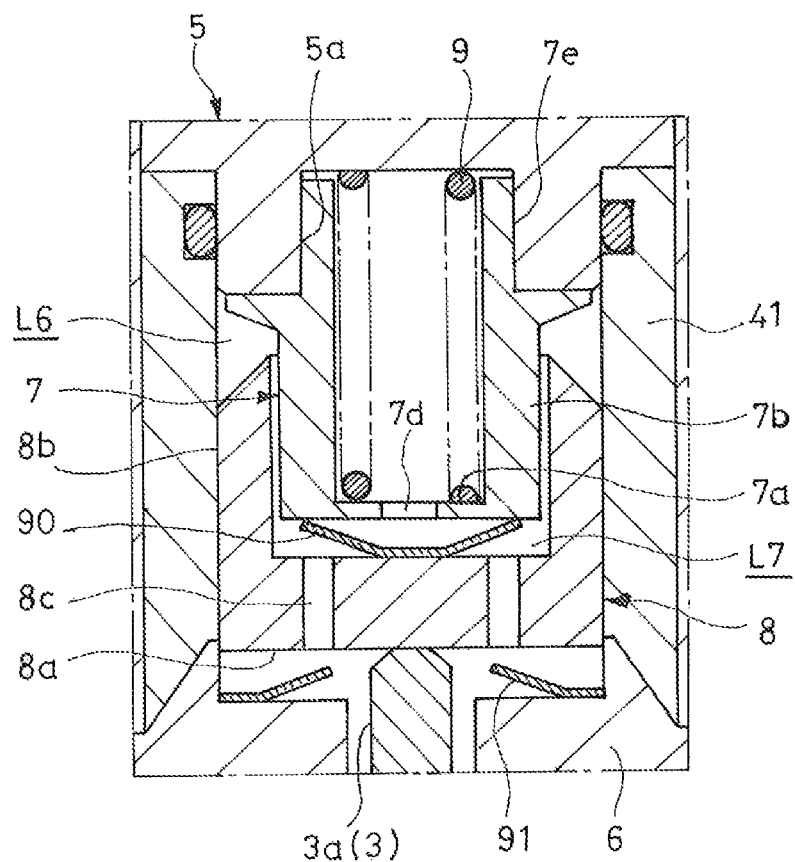
FIG. 5 shows a first modification of the solenoid according to the first embodiment of the present invention, and is a partially enlarged cross-sectional view of the solenoid according to the modification.
Figure 6:
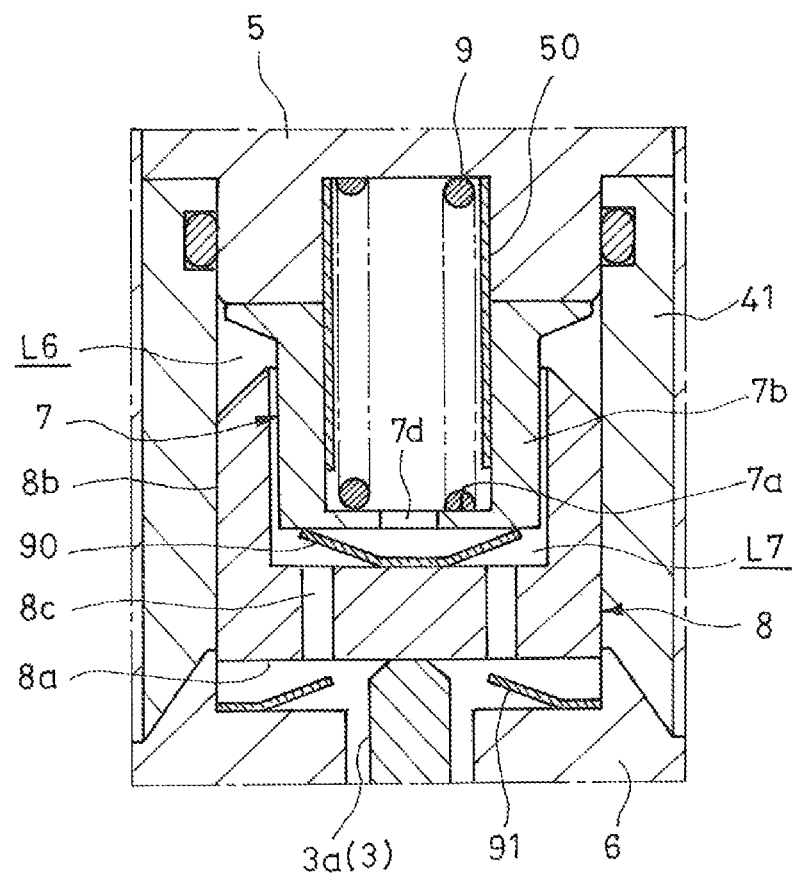
FIG. 6 shows a second modification of the solenoid according to the first embodiment of the present invention, and is a partially enlarged cross-sectional view of the solenoid according to the modification.

However, the configuration for regulating the shift of the first movable iron core 7 in the radial direction (direction orthogonal to the axial direction of the coil 4) with respect to the first fixed iron core 5 and the second fixed iron core 6 is not limited to the above configuration, and can be changed as appropriate. FIGS. 5 and 6 show modifications of the configuration for regulating the shift of the first movable iron core 7 in the radial direction (direction orthogonal to the axial direction of coil 4) with respect to the first fixed iron core 5 and the second fixed iron core 6. Each modification of the solenoid S1 according to the present embodiment will be specifically described below.

In the first modification of the solenoid S1 of the present embodiment, as shown in FIG. 5, a recess portion 5a that opens into the first movable iron core 7 side is formed in the first fixed iron core 5. Then, in place of the guide portion 7c shown in FIG. 3, the first movable iron core 7 includes a guide portion 7e extending in the axial direction from the tip of the inner tubular portion 7b, and slidably inserts the guide portion 7e into the recess portion 5a. In this case, the sliding gap formed between the guide portion 7e and the peripheral wall of the recess portion 5a is very narrow. The difference between the diameter of the peripheral wall of the recess portion 5a and the outer diameter of the guide portion 7e is smaller than the difference between the inner diameter of the outer tubular portion 8b and the outer diameter of the inner tubular portion 7b.

With the above-described configuration, it is possible to prevent the shift of the first movable iron core 7 in the radial direction (direction orthogonal to the axial direction of the coil 4) with respect to the first fixed iron core 5 and the second fixed iron core 6 by fitting the recess portion 5a of the first fixed iron core 5 with the guide portion 7e, and to simplify the configuration for preventing the shift. Furthermore, with the above-described configuration, when the guide portion 7e is lengthened in the axial direction and the fitting length is increased, it is possible to inhibit the inclination of the first movable iron core 7 within the filler ring 41, and to surely prevent the first movable iron core 7 from hindering the smooth up-and-down movement of the second movable iron core 8.

Next, in the second modification of the solenoid S1 of the present embodiment, as shown in FIG. 6, a pipe 50 protruding to the first movable iron core 7 side is attached to the first fixed iron core 5. Then, the pipe 50 is slidably inserted into the inner tubular portion 7b of the first movable iron core 7. In this case, the sliding gap formed between the pipe 50 and the inner tubular portion 7b is very narrow. The difference between the inner diameter of the inner tubular portion 7b and the outer diameter of the pipe 50 is smaller than the difference between the inner diameter of the outer tubular portion 8b and the outer diameter of the inner tubular portion 7b.

With the above-described configuration, it is possible to prevent the shift of the first movable iron core 7 in the radial direction (direction orthogonal to the center line X of the coil 4) with respect to the first fixed iron core 5 and the second fixed iron core 6 by fitting the pipe 50 provided in the first fixed iron core 5 with the inner tubular portion 7b of the first movable iron core 7, and to simplify the configuration for preventing the shift. Furthermore, with the above-described configuration, when the pipe 50 is lengthened in the axial direction and the fitting length is increased, it is possible to inhibit the inclination of the first movable iron core 7 within the filler ring 41, and to more surely prevent the first movable iron core 7 from hindering the smooth up-and-down movement of the second movable iron core 8.

In addition, the solenoid S1 according to the present embodiment constitutes the solenoid valve V together with the spool (valve body) 3 that opens and closes the pressure control passage p2. In addition, the solenoid S1 applies, to the spool (valve body) 3, force generated when a current is passed through the coil 4 and attracting the second movable iron core 8 to the second fired iron core 6 side in the direction of closing the pressure control passage p2. This makes it possible to adjust the valve opening pressure of the solenoid valve V by changing the current amount supplied to the solenoid S1, and to set the pressure upstream of the solenoid valve V to the valve opening pressure of the solenoid valve V.

Furthermore, as described above, the solenoid S1 of the present embodiment can increase the thrust force applied to the object as the current amount supplied when a current is passed increases. With this configuration, the solenoid valve V including the solenoid S1 of the present embodiment can increase the valve opening pressure of the spool 3 as the current amount supplied to the solenoid S1 increases. In addition, as described above, the solenoid S1 of the present embodiment can bias the object in the same direction as the thrust force when a current is passed by the spring 9 even when no current is passed. This allows the solenoid valve V provided with the solenoid S1 of the present embodiment to determine the valve opening pressure when no current is passed according to the specifications of the spring 9.

In addition, the solenoid valve V including the solenoid S1 of the present embodiment is provided in the shock absorber D. In addition to the solenoid valve V, the shock absorber D includes the cylinder 1, the piston rod 11 movably inserted into the cylinder 1 in the axial direction, the main passage M through which liquid flows when the cylinder 1 and the piston rod 11 move relatively in the axial direction, the main valve body 2 that opens and closes the main passage M, the pressure introduction passage p1 that is provided with the orifice O partway and reduces and leads the pressure upstream of the main valve body 2 in the main passage M to the back surface of the main valve body 2, and the pressure control passage p2 connected downstream of the orifice O of the pressure introduction passage p1 and provided with the solenoid valve V.

With the above-described configuration, when the cylinder 1 and the piston rod 11 move relatively in the axial direction, resistance is given by the main valve body 2 to the flow of liquid passing through the main passage M, and the damping force caused by the resistance is generated. In addition, since the back pressure of the main valve body 2 is set to the valve opening pressure of the solenoid valve V, the back pressure of the main valve body 2 can be adjusted by changing the current amount supplied to the solenoid S1. Then, as the back pressure of the main valve body 2 increases, the first valve body portion 2A of the main valve body 2 becomes difficult to open, and the generated extension side damping force increases. Therefore, with the above-described configuration, the extension side damping force generated by changing the current amount supplied to the solenoid S1 can be adjusted in magnitude.

Furthermore, as described above, the solenoid valve V including the solenoid S1 of the present embodiment can increase the valve opening pressure of the solenoid valve V as the current amount supplied to the solenoid S1 increases. Accordingly, the shock absorber D provided with the solenoid valve V including the solenoid S1 of the present embodiment can increase the back pressure of the main valve body 2 as the current amount supplied to the solenoid S1 increases, and can increase the generated extension side damping force.

That is, in the shock absorber D, since the extension side damping force generated when the current amount supplied to the solenoid S1 is small can be reduced, when the shock absorber D is used for vehicle suspension, the power consumption during normal traveling can be reduced. In addition, since heat generation of the solenoid S1 can be inhibited accordingly and a change in the temperature of the shock absorber D can be decreased, the change in damping force characteristics caused by the liquid temperature change (characteristics of damping force with respect to piston speed) can be decreased.

In addition, as described above, the solenoid valve V including the solenoid S1 of the present embodiment can determine the valve opening pressure when no current is passed according to the specifications of the spring 9. Therefore, in the shock absorber D provided with the solenoid valve V including the solenoid S1 of the present embodiment, the back pressure of the main valve body 2 can be increased even when no current is passed through the solenoid S1. Accordingly, the shock absorber D can prevent the extension side damping force from being insufficient even at the time of failure when the passage of current through the solenoid S1 is cut off. Furthermore, in the shock absorber D, it is required at least to provide the pressure control passage p2 as a passage connected to the back pressure chamber L4 to set the back pressure of the main valve body 2. Since it is unnecessary to switch the passage connected to the back pressure chamber L4 between when a current is passed and when no current is passed Through the solenoid S1, it is possible to inhibit the structure of the shock absorber D from becoming complicated and to reduce the cost.

Note that in the present embodiment, the back pressure of the main valve body 2 is controlled by the solenoid valve V only when the shock absorber D expands to cause the thrust force of the solenoid S1 in the solenoid valve V to act directly on the main valve body 2 in the closing direction when the shock absorber D contracts. However, of course, the back pressure of the main valve body may be controlled by the solenoid valve V when the shock absorber D contracts.

In addition, the rod entering and exiting the cylinder 1 does not necessarily have to be the piston rod to which the piston is attached, and the position of the main valve body whose back pressure is controlled by the solenoid valve V is not limited to a piston portion. For example, when the shock absorber includes a reservoir as described above, the main valve body may be provided with a passage connecting the extension side chamber or the compression side chamber to the reservoir as the main passage, and the back pressure of the main valve body may be controlled by the solenoid valve V. In addition, when the shock absorber is a uniflow type and the liquid circulates in one direction in the order of the extension side chamber, the reservoir, and the compression side chamber during expansion and contraction, the main valve body may be provided with the circulation passage that causes the extension side chamber to communicate with the reservoir as the main passage, and the back pressure of the main valve body may be controlled by the solenoid valve V.

Second Embodiment

Next, a solenoid S2 according to a second embodiment of the present invention shown in FIG. 7 will be described. The solenoid S2 according to the present embodiment is used for a solenoid valve in a similar manner to the solenoid S1 of the first embodiment. The solenoid S1 of the first embodiment shown in FIG. 2 can be replaced with the solenoid S2 of the present embodiment as it is. In addition, the solenoid S2 according to the present embodiment is similar to the solenoid S1 according to the first embodiment in basic structure. Common configurations are denoted with the same reference symbols and detailed description thereof will be omitted.

The major difference between the solenoid S2 of the present embodiment and the solenoid S1 according to the first embodiment is that a first movable iron core and a second movable iron core are disposed with the inside and outside reversed. More specifically, in the present embodiment, the first movable iron core 7A includes an inner tubular portion 7f and an outer tubular portion 7g that are doubly disposed inside and outside, a connecting portion 7h connecting one ends thereof in the axial direction, and an inner bottom portion 7i located at the other end of the inner tubular portion 7f, and causes the outer tubular portion 7g to be in sliding contact with the inner circumference of a filler ring 41 with the inner bottom portion 7i directed downward (second fixed iron core 6 side). Meanwhile, the second movable iron core 8A is tubular with a bottom and includes an outer bottom portion 8d and an intermediate tubular portion 8e standing on the outer circumference edge of the outer bottom portion 8d, and causes the intermediate tubular portion 8e to be in sliding contact with the inner circumference of the outer tubular portion 7g of the first movable iron core 7A with the outer bottom portion 8d directed downward (second fixed iron core 6 side).

In the inner bottom portion 7i of the first movable iron core 7A, a communication hole 7j penetrating the wall thickness is formed, and liquid can move through the communication hole 7j relatively without resistance. Accordingly, the liquid is not trapped on the upper side of the first movable iron core 7A (first fixed iron core 5 side), and the smooth up-and-down movement of the first movable iron core 7A is ensured. A spring 9 is inserted into the inner tubular portion 7f of the first movable iron core 7A. In the present embodiment as well, the spring 9 is a coil spring, and one end of the spring 9 hits the inner bottom portion 7i. Meanwhile, the other end of the spring 9 is supported by the first fixed iron core 5, and the spring 9 biases the first movable iron core 7A downward.

In addition, in the outer bottom portion 8d of the second movable iron core 8A, a communication hole 8f penetrating the wall thickness is also formed, and liquid can move through the communication hole 8f relatively without resistance. In addition, the inner diameter of the intermediate tubular portion 8e in the second movable iron core 8A is larger than the outer diameter of the inner tubular portion 7f in the first movable iron core 7A, and an annular gap is formed between the intermediate tubular portion 8e and the inner tubular portion 7f. Therefore, space L8 formed on the upper side of the tip of the intermediate tubular portion 8e (first fixed iron core 5 side) and space L9 formed between the outer bottom portion 8d and the inner bottom portion 7i are continuous. Then, since the communication hole 8f communicates with the continuous space, it is possible to prevent the liquid from being trapped in the space and damping force that hinders the movement of the second movable iron core 8A from being generated.

Furthermore, in the present embodiment, the first movable iron core 7A, which moves up and down (axial direction) with the outer tubular portion 7g supported by the filler ring 41, is not eccentric with respect to the filler ring 41 during the movement. Since the filler ring 41 is sandwiched between the first fixed iron core 5 and the second fixed iron core 6 and is provided fixedly thereto, the filler ring 41 prevents the first movable iron core 7A from shifting in a direction orthogonal to the center line of the coil (radial direction).

In addition, the second movable iron core 8A moves up and down (axial direction) with the intermediate tubular portion 8e supported by the outer tubular portion 7g of the first movable iron core 7A. In this way, in the solenoid S2 of the present embodiment, the second movable iron core 8A is inserted further into the first movable iron core 7A inserted into the filler ring 41. This makes it possible to prevent the first movable iron core 7A from shifting in the radial direction when adsorbed by the first fixed iron core 5, and to prevent the second movable iron core 8A from being sandwiched between the first movable iron core 7A shifted in the radial direction and the filler ring 41. There is no concern that the second movable iron core 8A will be sandwiched between the first movable iron core 7A shifted in the radial direction and the filler ring 41, and that the sliding resistance during the movement will increase.

Figure 7:
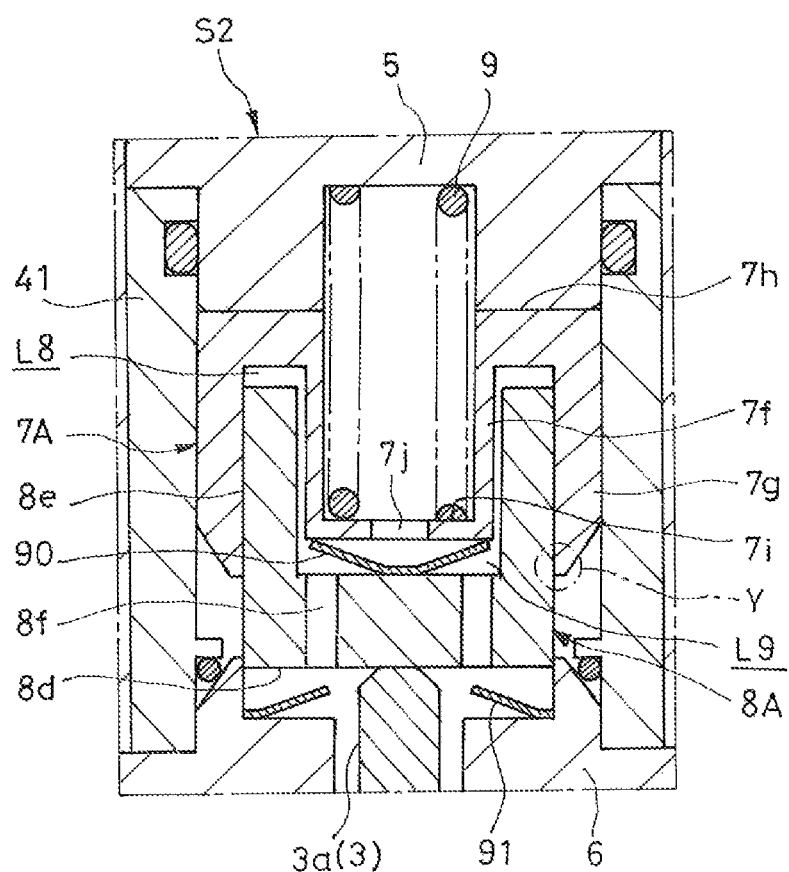
FIG. 7(a) is a partially enlarged cross-sectional view of a solenoid according to a second embodiment of the present invention.
FIG. 7(b) is as enlarged view of a Y portion of (a).
Figure 7:
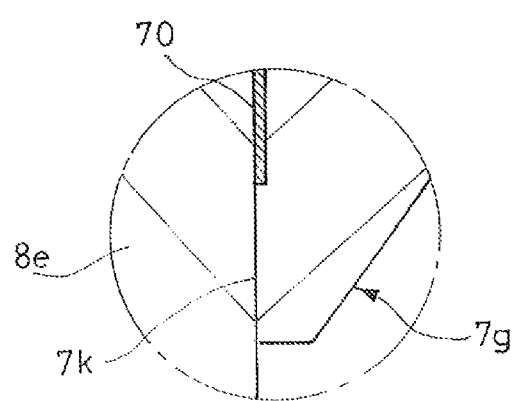

In addition, in the present embodiment, as shown in FIG. 7 (*b*), on the inner circumference of the tip of the outer tubular portion 7g of the first movable iron core 7A, a protrusion 7k protruding toward the center is provided, and a fluororesin sheet 70 is held by the protrusion 7k on the inner circumference of the outer tubular portion 7g. Accordingly, slidability of the intermediate tubular portion 8e of the second movable iron core 8A and the outer tubular portion 7g of the first movable iron core 7A is improved. Note that the material of the sheet 70 is not limited to fluororesin as long as the material has good slidability, and can be changed appropriately. Furthermore, the sheet 70 may be omitted and the intermediate tubular portion 8e may be directly in sliding contact with the inner circumference of the outer tubular portion 7g.

Next, in the present embodiment as well, leaf springs 90 and 91 that function as regulating parts are disposed above and below the outer bottom portion 8d of the second movable iron core 8A. In more detail, the upper leaf spring 90, which is a first regulating part, is located between the outer bottom portion 8d of the second movable iron core 8A and the inner bottom portion 7i of the first movable iron core 7A facing the outer bottom portion 8d up and down. The lower leaf spring 91, which is a second regulating part, is located between the outer bottom portion 8d of the second movable iron core 8A and the second fixed iron core 6 facing the outer bottom portion 8d up and down.

Then, when the first movable iron core 7A moves downward with respect to the second movable iron core 8A, the inner bottom portion 7i of the first movable iron core 7A hits the leaf spring 90. Then, the downward movement of the first movable iron core 7A with respect to the second movable iron core 8A is regulated, and after that, the first movable iron core 7A moves downward integrally with the second movable iron core 8A. In addition, when the second movable iron core 8A moves downward, the outer bottom portion 8d of the second movable iron core 8A hits and compresses the leaf spring 91, and does not move downward further.

Furthermore, a through hole is formed in the center of the second fixed iron core 6, and a shaft portion 3a of the spool 3 is movably inserted into the through hole. Then, the tip of the shaft portion 3a hits the outer bottom portion 8d of the second movable iron core 8A. Accordingly, in a state where the passage of current through the coil is cut off, the first movable iron core 7A goes downward in response to the biasing force of the spring 9, and hits the second movable iron core 8A via the leaf spring 90. Therefore, the spool 3 receives downward force by the biasing force of the spring 9. Meanwhile, when a current is passed through the coil, the first movable iron core 7A is attracted by the first fixed iron core 5, and the second movable iron core 8A is attracted by the second fixed iron core 6, then the spring 9 is compressed by the first movable iron core 7A and the biasing force is not transmitted to the spool 3, but the spool 3 receives downward force caused by force that attracts the second movable iron core 8A.

In addition, the leaf spring 90, which is the first regulating part, regulates an approach of the inner bottom portion 7i of the first movable iron core 7A and the outer bottom portion 8d of the second movable iron core 6A facing the inner bottom portion 7i up and down (axial direction) to prevent the first movable iron core 7A from adsorbing the second movable iron core 8A when a current is passed through the coil. Similarly, the leaf spring 91, which is a second regulating part, regulates an approach of the outer bottom portion 8d of the second movable iron core 8A and the second fixed iron core 6 facing the outer bottom portion 8d up and down (axial direction) to prevent the second movable iron core 8A from adsorbing the second fixed iron core 6 when a current is passed through the coil. Note that the first and second regulating parts are not limited to the leaf springs 90 and 91, respectively, and can be changed in a similar manner to the first embodiment.

Meanwhile, no regulating part is provided between the first fixed iron core 5 and the first movable iron core 7A. When a current is passed through the coil, the first movable iron core 7A is adsorbed by the first fixed iron core 5. In this way, when the first movable iron core 7A is adsorbed by the first fixed iron core 5 when a current is passed through the coil, the first movable iron core 7A compresses the spring 9. The posture of the first movable iron core 7A that prevents the biasing force of the spring 9 from being transmitted to the second movable iron core 8A side can be stably maintained. However, the first movable iron core 7A does not necessarily have to be adsorbed by the first fixed iron core 5 when a current is passed through the coil.

The relationship between the current amount supplied to the solenoid S2 according to the present embodiment and the force applied by the solenoid 32 to the spool (object) 3 is as shown in FIG. 4, in a similar manner to the solenoid S1 of the first embodiment. In addition, the operation of the shock absorber provided with the solenoid valve including the solenoid S2 according to the present embodiment is also similar to the operation of the shock absorber D provided with the solenoid valve V including the solenoid S1 of the first embodiment.

The action and effect of the solenoid S2 according to the present embodiment will be described below. Note that, of course, the configuration similar to the solenoid S1 of the first embodiment has similar action and effect, and detailed description thereof will be omitted here. In addition, the action and effect of the solenoid valve provided with the solenoid S2 according to the present embodiment and the shock absorber provided with the solenoid valve including the solenoid S2 are also similar to the action and effect of the solenoid S1 of the first embodiment, the solenoid valve V provided with the solenoid S1, and the shock absorber D provided with the solenoid valve V including the solenoid S1, and thus detailed description here will be omitted.

The solenoid S2 according to the present embodiment includes the coil, the first fixed iron core 5 located on a first end side of the axial direction of the coil, the second fixed iron core 6 located on a second end side of the axial direction of the coil with a gap with the first fixed iron core 5, the first movable iron core 7A disposed between the first fixed iron core 5 and the second fixed iron core 6 and attracted by the first fixed iron core 5 by the passage of current through the coil, the second movable iron core 8A disposed between the first fixed iron core 5 and the second fixed iron core 6 and attracted by the second fixed iron core 6 by the passage of current through the coil, the spring 9 that biases the first movable iron core 7A to the second fixed iron core 6 side, and the leaf spring (regulating part) 90 that regulates the movement of the first movable iron core 7A to the second fixed iron core 6 side with respect to the second movable iron core 8A. In addition, the movement of the first movable iron core 7A with respect to the first fixed iron core 5 and the second fixed iron core 6 in a direction orthogonal to the axial direction of the coil is regulated.

With the above-described configuration, when the first movable iron core 7A goes to the second fixed iron core 6 side in response to the biasing force of the spring 9 and the leaf spring 90 regulates the movement of the first movable iron core 7A to the second fixed iron core 6 side with respect to the second movable iron core 8A when no current is passed through the solenoid S2, the first movable iron core 7A and the second movable iron core 8A integrally move to the second fixed iron core 6 side. Therefore, when no current is passed through the solenoid S2, the biasing force of the spring 9 is transmitted to the second movable iron core 8A via the first movable iron core 7A and the leaf spring 90.

Meanwhile, when the first movable iron core 7A is attracted by the first fixed iron core 5 and moves in the attraction direction when a current is passed through the solenoid S2, the spring 9 is compressed by the first movable iron core 7A, and the biasing force of the spring 9 is not transmitted to the second movable iron core 8A. In addition, when a current is passed through the solenoid S2, the second movable iron core 8A is attracted by the second fixed iron core 6, and as the current amount supplied to the solenoid S2 increases, the force that attracts the second movable iron core 8A to the second fixed iron core 6 increases.

Therefore, when the force that attracts the second movable iron core 8A is applied to the object such as the spool 3 as thrust force when a current is passed through the solenoid S2, as the current amount supplied to the solenoid S2 increases, the thrust force applied to the object increases, and as the current amount supplied to the solenoid S2 decreases, the thrust force applied to the object can be decreased. Furthermore, when no current is passed, the biasing force of the spring 9 acts on the object via the first movable iron core 7A, the leaf spring (regulating part) 90, and the second movable iron core 8A. Since the direction of the biasing force of the spring 9 is the same as the direction of the force that attracts the second movable iron core 8A when a current is passed through the solenoid S2, with the above-described configuration, even when no current is passed through the solenoid S2, the object can be biased in the same direction as when a current is passed.

In addition, with the above-described configuration, as described above, when the first movable iron core 7A moves to the first fixed iron core 5 side against the biasing force of the spring 9 when a current is passed through the solenoid S2, the biasing force of the spring 9 is not transmitted to the second movable iron core 8A and Thus is not transmitted to the spool (object) 3. Therefore, the thrust force of the solenoid S2 when a current is passed and the biasing force applied to the object by the spring 9 when no current is passed can be arbitrarily set individually. Note that in the present embodiment, the spring 9 is a coil spring, but may be a spring other than the coil spring such as a disc spring.

In addition, the movement of the first movable iron core 7A of the solenoid S2 of the present embodiment in a direction orthogonal to the axial direction of the coil (direction along the center line X of the coil) with respect to the first fixed iron core 5 and the second fixed iron core 6 is regulated. In other words, the first movable iron core 7A does not move in the radial direction of the coil with respect to the first fixed iron core 5 and the second fixed iron core 6. Accordingly, the movement of the second movable iron core 8A is not hindered by the first movable iron core 7A shifted in the radial direction, and the smooth up-and-down movement of the second movable iron core 8A can be ensured. As a result, as described above, when the force that attracts the second movable iron core 8A is applied to the object as thrust force, hysteresis can be inhibited in the characteristics of the thrust force with respect to the current amount supplied to the solenoid S2, and the thrust force can be easily controlled.

In addition, the solenoid S2 according to the present embodiment includes the annular filler ring 41 interposed between the first fixed iron core 5 and the second fixed iron core 6. Then, the first movable iron core 7A includes the inner tubular portion 7f and the outer tubular portion 7q that are doubly disposed inside and outside, the connecting portion 7h connecting one ends of the inner tubular portion 7f and the outer tubular portion 7g in the axial direction, and the inner bottom portion 7i located at the other end of the inner tubular portion 7f, and is slidably inserted into the filler ring 41 with the inner bottom portion 7i directed to the second fixed iron core 6 side. Meanwhile, the second movable iron core 8A is tubular with a bottom and includes the outer bottom portion 8d and the intermediate tubular portion 8e standing on the outer circumference edge of the outer bottom portion 8d and having an inner diameter larger than an outer diameter of the inner tubular portion 7f of the first movable iron core 7A, and slidably inserts the intermediate tubular portion 8e into the outer tubular portion 7g of the first movable iron core 7A with the outer bottom portion 8d directed to the second fixed iron core 6 side. Furthermore, the spring 9 is interposed between the inner bottom portion 7i and the first fixed iron core 5 with one end side inserted into the inner tubular portion 7f of the first movable iron core 7A.

With the above-described configuration, when the coil is excited, a magnetic path is formed so as to pass through the first fixed iron core 5, the first movable iron core 7A, the second movable iron core 8A, and the second fixed iron core 6 to attract the first movable iron core 7A to the first fixed iron core 5 and attract the second movable iron core 8A to the second fixed iron core 6. Furthermore, space for housing the spring 9 can be secured inside the first movable iron core 7A.

In addition, with the above-described configuration, when the first movable iron core 7A moves to the second fixed iron core 6 side, the inner bottom portion 7i of the first movable iron core 7A approaches the outer bottom portion 8d of the second movable iron core 8A. Therefore, if the leaf spring (regulating part) 90 is disposed such that the movement in the approaching direction can be regulated, the movement of the first movable iron core 7A to the second fixed iron core 6 side with respect to the second movable iron core 8A can be regulated. Then, to dispose the leaf spring 90 in this way, for example, the leaf spring 90 is required at least to be disposed between the inner bottom portion 7i of the first movable iron core 7A and the outer bottom portion 8d of the second movable iron core 8A as in the present embodiment, which is easy to implement. That is, with the above-described configuration, the leaf spring (regulating part) 90 can be easily disposed.

Furthermore, in the solenoid S2, the intermediate tubular portion 8e of the second movable iron core 8A is slidably inserted into the outer tubular portion 7g of the first movable iron core 7A that is slidably inserted into the filler ring 41. In this way, since the second movable iron core 8A is inserted further into the first movable iron core 7A inserted in the filler ring 41, when adsorbed by the first fixed iron core 5, the first movable iron core 7A does not shift in the radial direction, and the second movable iron core 8A is not sandwiched between the first movable iron core 7A shifted in the radial direction and the filler ring 41. Therefore, the above-described configuration makes it possible to prevent the second movable iron core 8A from being sandwiched between the first movable iron core 7A shifted in the radial direction and the filler ring 41 to increase the sliding resistance during the movement, and to prevent the smooth up-and-down movement of the second movable iron core 8A from being hindered.

The preferred embodiments of the present invention have been described in detail above, but modifications, variations, and alterations can be made without departing from the scope of the claims.

REFERENCE SIGNS LIST

D Shock absorber
M Main passage
O Orifice
p1 Pressure introduction passage
p2 Pressure control passage
S1, S2 Solenoid
V Solenoid valve
1 Cylinder
2 Main valve body
3 Spool (valve body)
4 Coil
5 First fixed iron core
5a Recess portion
6 Second fixed iron core
7, 7A, First movable iron core
7a, 7i Inner bottom portion
7b, 7f Inner tubular portion
7c, 7e Guide portion
7g Outer tubular portion
7h Connecting portion
8, 8A Second movable iron core
8a, 8d Outer bottom portion
8b Outer tubular portion
8e Intermediate tubular portion
9 Spring
11 Piston rod (rod)
41 Filler ring
50 Pipe
90 Leaf spring (regulating part)

The invention claimed is:

1. A solenoid comprising:
    a coil;
    a first fixed iron core located on a first end side of the coil in an axial direction of the coil;
    a second fixed iron core located on a second end side of the coil in the axial direction of the coil with a gap with the first fixed iron core;
    a first movable iron core disposed between the first fixed iron core and the second fixed iron core inside the coil;
    a second movable iron core disposed between the first fixed iron core and the second fixed iron core inside the coil and closer to the second fixed iron core than the first movable iron core;
    an annular filler ring interposed between the first fixed iron core and the second fixed iron core;
    a spring that biases the first movable iron core to the second fixed iron core side; and
    a regulating part that regulates movement of the first movable iron core to the second fixed iron core side with respect to the second movable iron core,
    wherein when current flows in the coil, magnetic flux flows in a path of the first fixed iron core, the first movable iron core, the second movable iron core, and the second fixed iron core, causing the first movable iron core to be attracted toward the first fixed iron core and the second movable iron core to be attracted toward the second fixed iron core, movement of the first movable iron core in a direction orthogonal to the axial direction of the coil with respect to the first fixed iron core and the second fixed iron core is regulated, the second movable iron core is tubular with a bottom and includes an outer bottom portion and an outer tubular portion standing on an outer circumference edge of the outer bottom portion, and is movably inserted into the filler ring in the axial direction with the outer bottom portion directed to the second fixed iron core side, the first movable iron core is tubular with a bottom and includes an inner bottom portion and an inner tubular portion standing on an outer circumference edge of the inner bottom portion and having an outer diameter smaller than an inner diameter of the outer tubular portion, and the inner tubular portion is movably inserted into the outer tubular portion in the axial direction with the inner bottom portion directed to the second fixed iron core side, and the spring is interposed between the inner bottom portion and the first fixed iron core with a first end side inserted into the inner tubular portion.

2. The solenoid according to claim 1, wherein the first movable iron core includes a guide portion located at an outer circumference of a tip of the inner tubular portion protruding outward from the outer tubular portion and in sliding contact with an inner circumference of the filler ring.

3. The solenoid according to claim 1, wherein a recess portion that opens into the first movable iron core side is formed in the first fixed iron core, and the first movable iron core includes a guide portion extending in the axial direction from a tip of the inner tubular portion and slidably inserted into the recess portion.

4. The solenoid according to claim 1, further comprising: a pipe attached to the first fixed iron core and slidably inserted into the inner tubular portion.

5. A solenoid comprising:

a coil;

a first fixed iron core located on a first end side of the coil in an axial direction of the coil;

a second fixed iron core located on a second end side of the coil in the axial direction of the coil with a gap with the first fixed iron core;

a first movable iron core disposed between the first fixed iron core and the second fixed iron core inside the coil;

a second movable iron core disposed between the first fixed iron core and the second fixed iron core inside the coil and closer to the second fixed iron core than the first movable iron core;

an annular filler ring interposed between the first fixed iron core and the second fixed iron core;

a spring that biases the first movable iron core to the second fixed iron core side; and a regulating part that regulates movement of the first movable iron core to the second fixed iron core side with respect to the second movable iron core, wherein when current flows in the coil, magnetic flux flows in a path of the first fixed iron core, the first movable iron core, the second movable iron core, and the second fixed iron core, causing the first movable iron core to be attracted toward the first fixed iron core and the second movable iron core to be attracted toward the second fixed iron core, movement of the first movable iron core in a direction orthogonal to the axial direction of the coil with respect to the first fixed iron core and the second fixed iron core is regulated, the first movable iron core includes an inner tubular portion and an outer tubular portion that are doubly disposed inside and outside, a connecting portion connecting first ends of an axial direction of the inner tubular portion and the outer tubular portion, and an inner bottom portion located at a second end of the inner tubular portion, and is slidably inserted into the filler ring with the inner bottom portion directed to the second fixed iron core side, the second movable iron core is tubular with a bottom and includes an outer bottom portion and an intermediate tubular portion standing on an outer circumference edge of the outer bottom portion and having an inner diameter larger than an outer diameter of the inner tubular portion, and the intermediate tubular portion is slidably inserted into the outer tubular portion with the outer bottom portion directed to the second fixed iron core side, and the spring is interposed between the inner bottom portion and the first fixed iron core with a first end side inserted into the inner tubular portion.

6. A solenoid valve including the solenoid according to claim 1 and provided partway in a pressure control passage, further comprising:

a valve body that opens and closes the pressure control passage, wherein the solenoid applies, to the valve body, force to attract the second movable iron core to the second fixed iron core side in a direction of closing the pressure control passage, the force being generated when the current is passed through the coil.

7. A shock absorber including the solenoid valve according to claim 6, further comprising:

a cylinder;

a rod movably inserted into the cylinder in the axial direction;

a main passage through which liquid flows when the cylinder and the rod move relatively in the axial direction;

a main valve body that opens and closes the main passage;

a pressure introduction passage that is provided partway with an orifice and reduces and leads pressure upstream of the main valve body in the main passage to a back surface of the main valve body; and the pressure control passage connected downstream of the orifice of the pressure introduction passage and provided with the solenoid valve.

8. A solenoid valve including the solenoid according to claim 5 and provided partway in a pressure control passage, further comprising:

a valve body that opens and closes the pressure control passage, wherein the solenoid applies, to the valve body, force to attract the second movable iron core to the second fixed iron core side in a direction of closing the pressure control passage, the force being generated when the current is passed through the coil.

9. A shock absorber including the solenoid valve according to claim 8, further comprising:

a cylinder;

a rod movably inserted into the cylinder in the axial direction;

a main passage through which liquid flows when the cylinder and the rod move relatively in the axial direction;
a main valve body that opens and closes the main passage;
a pressure introduction passage that is provided with an orifice partway and reduces and leads pressure upstream of the main valve body in the main passage to a back surface of the main valve body; and
the pressure control passage connected downstream of the orifice of the pressure introduction passage and provided with the solenoid valve.

* * * * *